United States Patent
Yeonsoo et al.

(10) Patent No.: US 12,456,339 B2
(45) Date of Patent: Oct. 28, 2025

(54) ACCESS CONTROL METHOD FOR SOLVING FRONT-TO-BACK AMBIGUITY AND DEVICE USING THE SAME

(71) Applicant: SUPREMA INC., Seongnam-si (KR)

(72) Inventors: Chu Yeonsoo, Gunpo-si (KR); Yoon Siwoong, Gwangju-si (KR); Jeon Yongwook, Gwangju-si (KR)

(73) Assignee: SUPREMA INC., Seongnam-si (KR)

( * ) Notice: Subject to any disclaimer, the term of this patent is extended or adjusted under 35 U.S.C. 154(b) by 0 days.

(21) Appl. No.: 19/020,339

(22) Filed: Jan. 14, 2025

(65) Prior Publication Data
US 2025/0265878 A1    Aug. 21, 2025

(30) Foreign Application Priority Data
Feb. 16, 2024    (KR) .................. 10-2024-0022336

(51) Int. Cl.
G07C 9/00    (2020.01)

(52) U.S. Cl.
CPC ............ *G07C 9/00309* (2013.01); *G07C 2009/00769* (2013.01); *G07C 2209/64* (2013.01)

(58) Field of Classification Search
None
See application file for complete search history.

(56) References Cited

U.S. PATENT DOCUMENTS

| | | | | |
|---|---|---|---|---|
| 4,867,027 A | * | 9/1989 | Barbera | G10H 3/185 84/DIG. 24 |
| 12,133,314 B2 | * | 10/2024 | Shanjani | H04B 10/11 |
| 12,196,836 B2 | * | 1/2025 | Hong | G01S 13/765 |
| 12,196,840 B2 | * | 1/2025 | Doedlinger | G01S 13/0209 |
| 2012/0194377 A1 | * | 8/2012 | Yukumatsu | G01S 13/347 342/368 |
| 2020/0300972 A1 | * | 9/2020 | Wang | A61B 5/0002 |
| 2023/0024636 A1 | * | 1/2023 | Hong | G01S 11/02 |
| 2024/0241242 A1 | * | 7/2024 | Shin | G01S 13/48 |

\* cited by examiner

*Primary Examiner* — Carlos Garcia
(74) *Attorney, Agent, or Firm* — Maschoff Brennan

(57) ABSTRACT

An access control device according to an embodiment includes: a communication module configured to perform communication by using a UWB communication protocol and one or more processors, and the communication module includes: a substrate, an antenna disposed on a first surface of the substrate, and a ground disposed on a second surface which is opposite to the first surface of the substrate, and the one or more processors are configured to: receive a signal from a user terminal through the communication module; and determine whether the user terminal is positioned in a first direction or second direction, based on a change in a phase angle of the signal received from the user terminal when a direction from the substrate to the antenna is the first direction and a direction from the substrate to the ground is the second direction.

12 Claims, 18 Drawing Sheets

ACCESS CONTROL METHOD FOR SOLVING FRONT-TO-BACK AMBIGUITY AND DEVICE USING THE SAME

CROSS-REFERENCE TO RELATED APPLICATION(S)

This application is based on and claims priority under 35 U.S.C. § 119 to Korean Patent Application No. 10-2024-0022336, filed on Feb. 16, 2024, in the Korean Intellectual Property Office, the disclosure of which is herein incorporated by reference in its entirety.

BACKGROUND

Field

The disclosure relates to an access control method for solving front-to-back ambiguity and a device using the same.

Description of Related Art

Ultra-wideband (UWB) communication-based positioning is increasingly used to measure a distance between two or more devices. UWB communication-based positioning may be divided into a time difference of arrival (TDoA) method and a phase difference of arrival (PDoA) method.

The TDoA method refers to a method for tracing a plurality of tags through a plurality of anchors.

The PDoA method refers to a method for tracing a plurality of tags through one anchor, and is increasingly used in recent years.

However, the PDoA method is optimized for portable terminals like smartphones, and, when the PDoA method is applied to a fixed terminal such as an access authentication device, there may be a problem of front-to-back ambiguity.

Recently, researches for solving the front-to-back ambiguity problem are being conducted.

SUMMARY

An object to be achieved by the disclosure is to provide an access authentication device for solving a front-to-back ambiguity problem.

The object to be achieved by the disclosure is not limited to that mentioned above, and other objects that are not mentioned above may be clearly understood to those skilled in the art based on the detailed descriptions and the accompanying drawings.

According to an embodiment, an access control device may include: a communication module configured to perform communication by using a UWB communication protocol; and one or more processors configured to control the access control device to perform communication with a user terminal positioned in the proximity of the access control device by using the communication module, and the communication module may include: a substrate; an antenna disposed on a first surface of the substrate; and a ground disposed on a second surface which is opposite to the first surface of the substrate, and the one or more processors may be configured to: receive a signal from the user terminal through the communication module; and determine whether the user terminal is positioned in a first direction or second direction, based on a change in a phase angle of the signal received from the user terminal when a direction from the substrate to the antenna is the first direction and a direction from the substrate to the ground is the second direction.

The means for solving the problem is not limited to that mentioned above, and other means for solving that are not mentioned above may be clearly understood to those skilled in the art based on the detailed descriptions and the accompanying drawings.

According to the disclosure, a front-to-back ambiguity problem may be solved.

The effect of the disclosure is not limited to that mentioned above, and other effects that are not mentioned above may be clearly understood to those skilled in the art based on the detailed descriptions and the accompanying drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
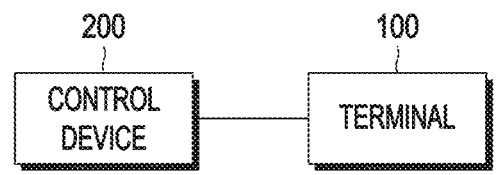
FIG. 1 is a environment view illustrating a management system according to an embodiment.

Embodiments described in the specification are provided to clearly describe the technical concept of the disclosure for those of ordinary skill in the art, and the disclosure is not limited to the embodiments set forth in the specification, and the scope of the disclosure should be interpreted as including various modifications or changes without departing from the technical concept of the disclosure.

The terms used in the specification are general terms that are widely used by considering functions of the disclosure, but the terms may vary depending on intentions of those of ordinary skill in the art, precedents or advent of new technologies. However, if a term is defined as having a certain meaning and is used, the meaning of the term will be specified separately. Accordingly, the terms used in the specification should be interpreted not based on the names of the terms but based on substantial meanings of the terms and contents described throughout the specification.

The drawings attached with the specification are provided to assist in an easy explanation of the disclosure, and shapes illustrated in the drawings may be displayed in an exaggerated way for easy understanding of the disclosure if necessary, and the disclosure is not limited by the drawings.

In the specification, detailed descriptions of well-known configurations or functions will be omitted since they would unnecessarily obscure the subject matters of the disclosure.

Hereinafter, an access management method and an access management device using the same according to an embodiment of the disclosure will be described.

FIG. 1 is a view illustrating an environment of a management system according to an embodiment.

Referring to FIG. 1, the management system 10 may include a terminal 100 and a control device 200.

The terminal 100 may communicate with the control device 200, and may transmit or receive a variety of information. For example, the terminal 100 may transmit or receive information necessary for user authentication to or from the control device 200. Herein, user authentication may refer to authentication that is performed to determine whether a user or a user terminal has a specific authority. For example, user authentication may include authentication of various authorities, such as access authority authentication on whether a user or a user terminal has an authority to access a specific region, payment authority authentication on whether a user or a user terminal has an authority to perform payment processing, using authority authentication on whether a user or a user terminal has an authority to use a specific device, and operation mode setting authentication on whether a user or a user terminal has an authority to set an operation mode of a specific device.

In addition, the terminal 100 may transmit an access request and/or data necessary for the access request to the control device 200. In addition, according to an embodiment, the terminal 100 may perform the above-described user authentication.

In addition, when user authentication is performed, the terminal 100 may request the control device 200 to process user authentication, and may acquire a result of the request for processing for user authentication from the control device 200. In addition, the terminal 100 may acquire information on whether it is possible to perform processing for user authentication from the control device 200, and may perform processing for user authentication based on the information.

In addition, an application for conducting some embodiments, which will be described below, may be provided to the terminal 100.

The terminal 100 may be implemented by a smartphone, a tablet, a personal digital assistant (PDA), a laptop, a wearable device, or the like. Alternatively, the terminal 100 may be implemented by a smart card, an integrated circuit (IC) card, a magnetic card, a radio frequency (RF) chip which is capable of recording data, or the like.

The control device 200 may communicate with the terminal 100, and may transmit or receive a variety of information. In addition, the control device 200 may perform various processing operations according to a user authentication result described above. For example, the control device 200 may control access by a user to a specific region, may control payment processing of a user, may control use of a specific device by a user, or may control an operation mode of a specific device according to a user authentication result.

Specifically, when access by a user to a specific region is restricted by a gate, the control device 200 may control the gate to control the access by the user to the specific region according to a user authentication result. Herein, the gate may be a device that physically restricts access by a user, and may include an access restriction device (for example, an access bar, an access door, etc.). The control device 200 may provide an unlock signal to the gate according to a user authentication result to control the gate to be opened and allow access by a user. In addition, the control device 200 may not provide the unlock signal to the gate or may provide a lock signal to the gate according to a user authentication result to control the gate to be closed and to prevent access by a user. In addition, according to an embodiment, the control device 200 may be disposed inside or outside the gate.

In addition, when the control device 200 controls payment processing, the control device 200 may perform a payment authorization procedure as a process according to a user authentication result. For example, the control device 200 may receive a payment request from the terminal 100 and may accept or refuse the payment request based on a user authentication result. In addition, according to an embodiment, the payment authorization procedure may be performed in the terminal 100.

In addition, the control device 200 may perform various control operations based on a user authentication result. For example, when the control device 200 controls a gate for accessing a public transportation, the control device 200 may control the gate based on a payment authorization result. In addition, the control device 200 may provide the payment authorization result to at least one of a server or the terminal 100. In addition, when the control device 200 controls use of a specific device according to a user authentication result, the control device 200 may control the use of the specific device through software installed in the specific device, or may control the use of the specific device by controlling a restriction device for physically restricting the use of the specific device, based on a user authentication result.

In addition, when the control device 200 controls an operation mode of a specific device, the control device 200 may configure the operation mode of the specific device based on a user authentication result. For example, when the control device 200 controls an access control device for managing access to a specific region, the control device 200 may control the access control device in a security mode for increasing a security level in the specific region, or may control the access control device in a normal mode in which the security mode is disabled according to a user authentication result. In addition, according to an embodiment, the access control device may be included in the control device 200.

Various processing operations performed according to a user authentication result may also be performed in the terminal 100.

In addition, according to an embodiment, the control device 200 may perform the above-described operation for user authentication. When user authentication is performed, the control device 200 may request the terminal 100 to process user authentication, and may acquire a result of the request for processing from the terminal 100. In addition, the control device 200 may acquire a result on whether it is possible to perform processing for user authentication from the terminal 100, and may perform processing for user authentication based on the result.

However, the diagram of the environment illustrated in FIG. 1 is merely an example for the convenience of explanation and the disclosure is not limited thereto. According to some embodiments, components may be added to the diagram of the environment of FIG. 1 or may be omitted, and also, may be divided.

Figure 2:
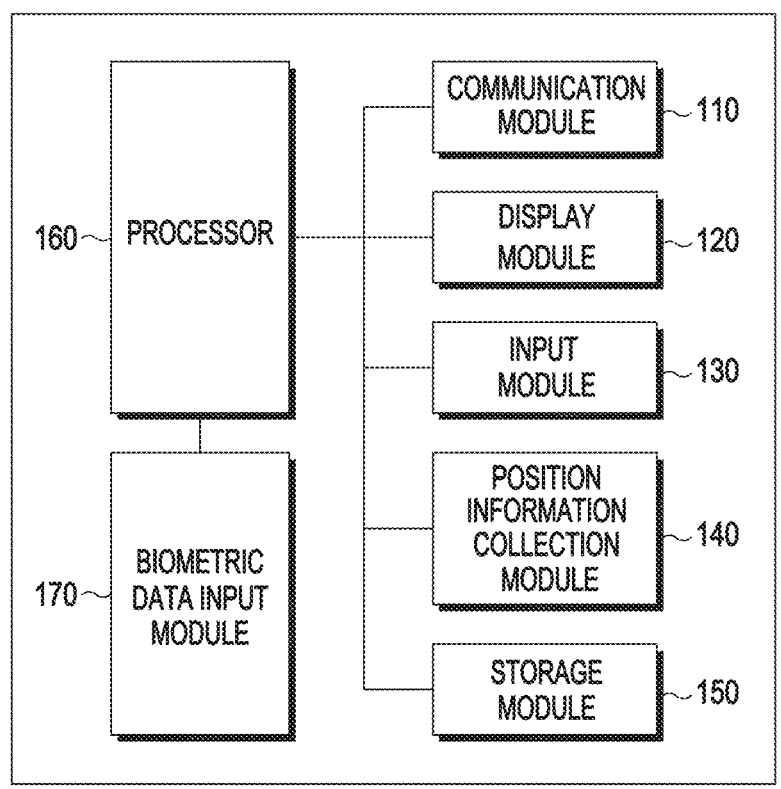
FIG. 2 is a block diagram of a terminal according to an embodiment.

FIG. 2 is a block diagram of the terminal according to an embodiment.

Referring to FIG. 2, the terminal 100 may include a communication module 110, a display module 120, a input module 130, a position information collection module 140, a storage module 150, a processor 160, and a biometric data input module 170.

The communication module 110 may communicate with at least one of a server or the control device 200. For example, the communication module 110 may transmit or receive information necessary for user authentication or information on a user authentication result to or from at least one of the server or the control device 200.

In addition, the communication module 110 may include a mobile communication module employing Bluetooth low energy (BLE), Bluetooth, wireless local area network (WLAN), Wireless Fidelity (WiFi), WiFi Direct, near field communication (NFC), infrared data association (IrDA), ultra wide band (UWB), Zigbee, $3^{rd}$ generation (3G), 4G, or 5G, and a wired or wireless module to transmit or receive data through various other communication standards.

The display module 120 may output a variety of visual information. For example, when the control device 200 is detected through communication with the control device 200 and a communication connection is established, the display module 120 may output relevant information. In addition, the display module 120 may visually output a user authentication result. In addition, the display module 120 may visually output a message received from the server.

The display module 120 may be a liquid crystal display (LCD), an organic light emitting diode (OLED), an active matrix organic LED (AMOLED) display, or the like. When the display module 120 is provided as a touch screen, the display module 120 may perform a function of the input module 130. In this case, a separate input module 130 may not be provided according to selection, and the input module 130 performing a limited function, such as volume control, power button, and a home button, may be provided.

The input module 130 may acquire a signal corresponding to a user input. For example, the input module 130 may acquire an input for requesting user authentication from the server or the control device 200. In addition, the input module 130 may acquire an input for acquiring information necessary for user authentication (for example, user authority information, user private information (or identification information of a user or a terminal, identification information necessary for payment processing (for example, card information of a user, authentication information corresponding to card information), user biometric data, encryption information, etc.)).

In addition, the input module 130 may be implemented by a keyboard, a key pad, a button, a jog shuttle, a wheel or the like. In addition, the user input may be, for example, pressing of a button, touch and drag. When input module 130 is implemented by a touch screen, the display module 120 may perform the role of the input module 130.

The position information collection module 140 may acquire position information for identifying a position of the terminal 100. For example, the position information collection module 140 may acquire coordinate information for determining a position like a global positioning system (GPS) sensor. In another example, the position information collection module 140 may determine the position of the terminal 100 based on a signal received from an external device. For example, when the terminal 100 receives a signal indicating a specific region from the control device 200, the terminal 100 may identify that the terminal 100 is in the specific region in response to reception of the signal.

In addition, the storage module 150 may store various data. For example, the storage module 150 may store data necessary for operations of the terminal 100 (for example, information necessary for user authentication (for example, user authority information, user private information (or identification information of a user or a terminal, identification information necessary for payment processing (for example, card information of a user, authentication information corresponding to card information), user biometric data, encryption information, etc.))).

The storage module 150 may include a storage medium of at least one type of a flash memory type, a hard disk type, a multimedia card micro type, a memory of a card type (for example, a SD or XD memory), a random access memory (RAM), a static random access memory (SRAM), a read only memory (ROM), an electrically erasable programmable read-only memory (EEPROM), a programmable read-only memory (PROM) magnetic memory, a magnetic disk, an optical disk. The memory may store information temporarily, permanently, or semi-permanently, and may be provided in an embedded type or a removable type.

The processor 160 may control respective components of the terminal 100 or may process or compute a variety of information. The processor 160 may be composed of one or more processors. In addition, the processor 160 may acquire signals from some components included in the terminal 100. In addition, the processor 160 may control operations for performing some steps performed in the terminal 100 among the steps of methods which will be described below, or may perform computation necessary for performing the steps.

The processor 160 may be implemented by software, hardware, and a combination thereof. For example, in terms of hardware, the processor 160 may be implemented by a field programmable gate array (FPGA), an application specific integrated circuit (ASIC), a semiconductor chip, and electronic chips of various other types. In another example, in terms of software, the processor 160 may be implemented by a logic program or various computer languages which are performed according to the above-described hardware.

Additionally, the processor 160 may be driven by a predetermined operating system. For example, the processor 160 may be driven by an operating system of Android or iOS.

The biometric data input module 170 may receive biometric data of a user. The biometric data may refer to at least one of voice, fingerprint, iris, face, and vein information of the user. The biometric data input module 170 may be implemented by at least one of a microphone to which voice information of a user is inputted, a screen scanner to which fingerprint information of a user is inputted, a camera to which iris, face, vein information of a user is inputted.

The terminal 100 may not necessarily include all of the above-described components, and some components may be omitted according to selection. For example, when the terminal 100 does not receive biometric data, the terminal 100 may be provided without the biometric data input module 170. In addition, the terminal 100 may be provided with a component added to perform an additional function and operation according to selection.

Figure 3:
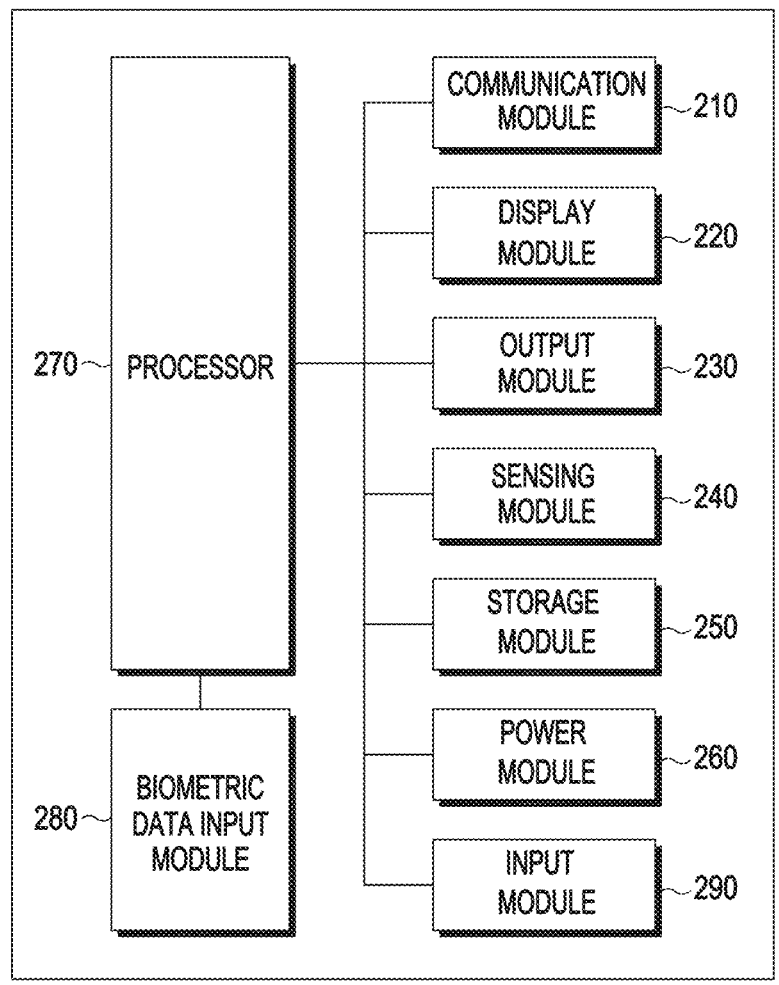
FIG. 3 is a block diagram of a control device according to an embodiment.

FIG. 3 is a block diagram of the control device according to an embodiment.

Referring to FIG. 3, the control device 200 may include a communication module 210, a display module 220, an output module 230, a sensing module 240, a storage module 250, a power module 260, a processor 270, a biometric data input module 280, and an input module 290.

The communication module 210 may communicate with at least one of the server or the terminal 100. For example, the communication module 210 may transmit or receive information necessary for user authentication or user authentication result information to or from at least one of the server or the terminal 100.

The communication module 210 may generally perform communication according to wireless communication standards, and may include a mobile communication module employing BLE, Bluetooth, WLAN, WiFi, WiFi Direct, NFC, IrDA, UWB, Zigbee, 3G, 4G, or 5G, and a wired or wireless module to transmit data through various other communication standards. In addition, the communication module 210 may include a short-range wireless module that supports NFC, radio frequency identification (RFID).

The display module 220 may output information to be visually provided to a user. For example, when a door open signal is received, the display module 220 may output visual information indicating the reception of the door open signal.

The display module 220 may be an LCD, an OLED, an AMOLED display. When the display module 220 includes a touch panel, the display module 220 may operate as an input device which is based on a touch input.

The output module 230 may output information to be acoustically provided to a user. For example, when the door open signal is received, the output module 230 may output auditory information indicating the reception of the door open signal. In addition, when a setting change signal is received, the output module 230 may output auditory information indicating the reception of the setting change signal.

The output module 230 may be a speaker or a buzzer to output a sound.

The sensing module 240 may acquire a signal regarding an external environment that is necessary for the control device 200. For example, the sensing module 240 may identify whether there exists a movable object (for example, a user) in the proximity of the control device 200. In addition, the sensing module 240 may be disposed in the control device 200 or may be disposed in the proximity of the control device 200. According to an embodiment, the sensing module 240 may not be included in the control device 200. In this case, a separate sensor may be disposed in the proximity of the control device 200.

A variety of information may be stored in the storage module 250. For example, the storage module 250 may store a program for performing a control operation of the processor 270, and may store data received from the outside and data generated in the processor 270. In addition, the storage module 250 may store information necessary for operations of the control device 200 (for example, information necessary for user authentication (for example, user authority information, identification information of a user (for example, identifier information of a user or a user terminal, biometric data of a user, encryption information))), and user authentication result information.

The storage module 250 may include a storage medium of at least one type of a flash memory type, a hard disk type, a multimedia card micro type, a memory of a card type (for example, a SD or XD memory), a RAM, a SRAM, a ROM, an EEPROM, a PROM magnetic memory, a magnetic disk, an optical disk. The memory may store information temporarily, permanently, or semi-permanently, and may be provided in an embedded type or a removable type.

The power module 260 may provide a power necessary for locking or unlocking a gate. In addition, the power module 260 may provide a power necessary for opening or closing a gate. The power module 260 may be provided as a motor, a solenoid, or an actuator.

When the power module 260 provides a power necessary for locking or unlocking a gate, the power module 260 may provide a power to change and/or maintain a lock module (not shown) for locking or unlocking the gate to go into a lock or unlock state. The lock module may be provided as a deadbolt, a latch bolt, or a combination thereof. In addition, the lock module is not limited to the deadbolt and the latch bolt, and typical lock modules may be used.

According to an embodiment, the power module 260 may be included in the control device 200 or may not be included in the control device 200. In addition, the power module 260 may be disposed in the proximity of the control device 200 in the form of a separate device. In this case, the control device 200 may provide a signal for controlling the power module 260 to the power module 260. In addition, the lock module described above may be included in the control device 200, or may be disposed in the proximity of the control device 200 to receive control of the control device 200.

The processor 270 may control respective components of the control device 200 or may process and compute a variety of information. The processor 270 may be composed of one or more processors. The processor 270 may acquire signals from some components included in the control device 200. In addition, the processor 270 may control operations for performing some steps performed in the control device 200 among the steps of the methods which will be described below, or may perform computation necessary for performing the steps.

The processor 270 may be implemented by software, hardware, and a combination thereof. For example, in terms of hardware, the processor 270 may be implemented by a FPGA, an ASIC, a semiconductor chip, or electronic circuits of various types. For example, in terms of software, the processor 270 may be implemented by a logic program or various computer languages which are performed according to the above-described hardware.

The biometric data input module 280 may receive an input of biometric data of a user. For example, the biometric data input module 280 may receive at least one of voice, fingerprint, iris, face and vein information of a user. The biometric data input module 280 may be implemented by at least one of a microphone to which voice information of a user is inputted, a screen scanner to which fingerprint information of a user is inputted, or a camera to which iris, face, vein information of a user is inputted.

The input module 290 may be configured to receive various inputs. For example, the input module 290 may acquire an input for requesting user authentication from the server or the terminal 100. In addition, the input module 290 may acquire an input for acquiring information necessary for user authentication (for example, identification information of a user or user terminal, encryption information, biometric data). In addition, the input module 290 may receive an input of setting change information for changing setting of the control device 200.

In addition, the input module 290 may receive an input of a user authentication request from a user. For example, when user authentication is authentication of user's access to a specific region, the control device 200 may receive an input for opening a door, and may open the door by actuating the power module 260, or may transmit an access authentication request signal to the server or the terminal 100. For example, the input module 290 may be implemented by a keyboard, a key pad, a button, a switch, a jog shuttle, a wheel or the like. In addition, the user's input may be, for example, pressing of a switch, pressing of a button, touch and drag. When the display module 220 is implemented by a touch screen, the display module 220 may perform the role of the input module 290.

The control device 200 according to an embodiment of the disclosure does not necessarily include all of the above-described components, and some components may be omitted according to selection.

For example, the control device 200 may include a control device 200 including a communication module 210 and a processor 270. More specifically, the control device 200 may perform a function of receiving information that is acquired from the terminal 100 through the communication module 210 performing a function of a reader, analyzing the acquired information through the processor 270 performing a function of a controller, and controlling operations such as access management, attendance and absence management, system mode change.

In addition, the control device 200 may be provided with a component added to perform an additional function and operation according to selection.

Figure 4:
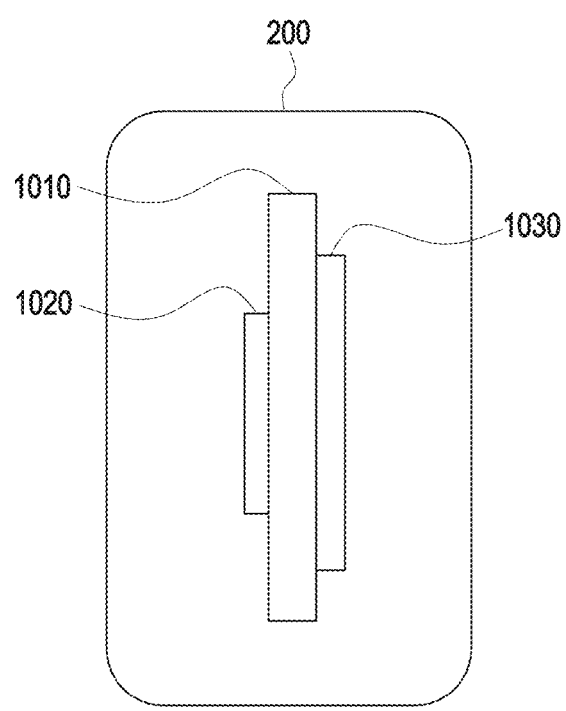
FIG. 4 is a view provided to explain the control device according to an embodiment.

FIG. 4 is a view provided to explain a control device according to an embodiment.

Referring to FIG. 4, the communication module 210 of the control device 200 described above may include a substrate 1010, an antenna 1020, and a ground 1030.

As shown in FIG. 4, the antenna 1020 may be disposed on one surface of the substrate 1010, and the ground 1030 may be disposed on another surface of the substrate 1010. The antenna 1020 may transmit or receive a signal. For example, the antenna 1020 may transmit or receive a UWB signal indicating a signal generated by a UWB communication protocol. In addition, two or more antennas 1020 may be implemented.

In addition, the ground 1030 may be made of a conductive material. For example, the ground 1030 may be made of copper. In addition, the ground 1030 may be implemented in the form of a plate or may be implemented in a predetermined pattern. In addition, the ground 1030 may be made of phosphorus bronze, aluminum, mild steel, etc.

Since the ground 1030 is made of the conductive material as described above, substantial electric shielding may occur on the surface of the substrate 1010 on which the ground 1030 is disposed. This will be described in detail below with reference to FIG. 5.

Figure 5:
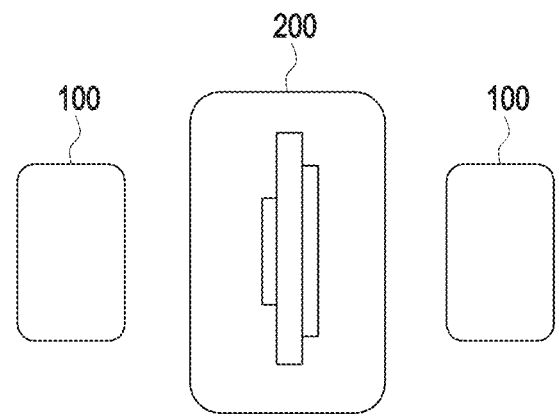
FIG. 5 is a view provided to explain signal exchange between a control device and a terminal according to an embodiment.
Figure 5:
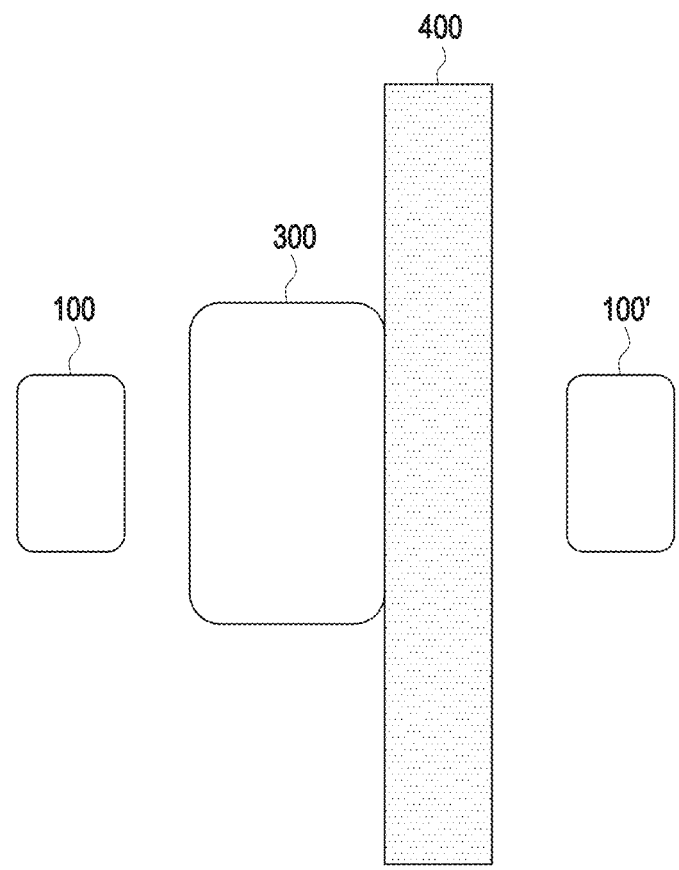

(A) of FIG. 5 is a view provided to explain signal exchange between a control device and a terminal according to an embodiment, and (B) of FIG. 5 is a view provided to explain signal exchange between a control device and a terminal according to an embodiment.

Referring to (A) of FIG. 5, a control device 200 may have an antenna disposed on one surface of a substrate and a ground disposed on another surface of the substrate, which is the same as shown in FIG. 4. The ground may be made of a conductive material. When a direction from the substrate to the antenna is defined as a first direction and a direction from the substrate to the ground is defined as a second direction, the terminal 100 may be positioned in the first direction and the terminal 100' may be positioned in the second direction. In addition, a distance between the control device 200 and the terminal 100 and a distance between the control device 200 and the terminal 100' may be the same. If there is no obstacle between the control device 200 and the terminal 100 and the terminal 100', there may not be a hindrance to propagation of signals between the control device 200 and the terminal 100 when the control device 200 and the terminal 100 exchange signals. However, when the control device 200 and the terminal 100' exchange signals, the ground of the control device 200 may reflect and/or absorb signals exchanged between the control device 200 and the terminal 100' since the ground is made of a conductive material. Accordingly, radio interference may occur in signals exchanged between the control device 200 and the terminal 100'. That is, radio interference may not occur between the control device 200 and the terminal 100, whereas radio interference may occur between the control device 200 and the terminal 100'. The control device 200 may determine whether a terminal is in the first direction or the second direction, by using a difference in the radio interference in signals transmitted and received by the control device 200.

In addition, in (B) of FIG. 5, a control device 300 may be the control device 200 described in FIG. 4 or may be a control device that has different arrangements from the arrangements of the antenna and the ground described in FIG. 4. The control device 300 may be disposed on one surface of a wall 400.

When a direction from the wall 400 to the control device 300 is defined as a first direction and the opposite direction of the first direction is defined as a second direction, the terminal 100 may be positioned in the first direction and the terminal 100' may be positioned in the second direction. In addition, a distance between the control device 300 and the terminal 100 and a distance between the control device 300 and the terminal 100' may be the same. If there is no obstacle between the control device 300 and the terminal 100 and there is the wall 400 between the control device 300 and the terminal 100', there may be no hindrance to propagation of signals between the control device 300 and the terminal 100 when the control device 300 and the terminal 100 exchange signals. However, when the control device 300 and the terminal 100' exchange signals with each other, the wall 400 on which the control device 300 is disposed may reflect and/or absorb signals exchanged between the control device 300 and the terminal 100'. Accordingly, radio interference may occur in signals exchanged between the control device 300 and the terminal 100'. That is, no radio interference may occur between the control device 300 and the terminal 100, whereas radio interference may occur between the control device 300 and the terminal 100'. The control device 300 may determine whether a terminal is in the first direction or the second direction, by using a difference in the radio interference in signals transmitted and received by the control device 300.

A positioning method of a control device 300 for a terminal 100, 100' will be described in detail below.

Figure 6:
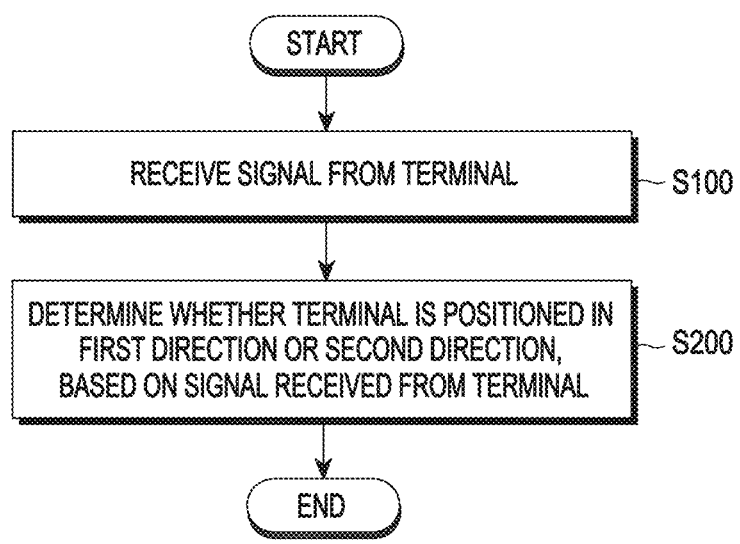
FIG. 6 is an operation flowchart provided to explain a positioning method of a control device according to an embodiment.

FIG. 6 is an operation flowchart provided to explain a positioning method of a control device according to an embodiment.

Referring to FIG. 6, a control device may receive a signal from a terminal (S100). For example, the control device may receive a UWB signal indicating a signal generated by a UWB communication protocol from the terminal. The UWB communication protocol may refer to a short-range high-speed wireless communication protocol which uses a wide frequency band of several GHz or more, a low spectrum density, and a short pulse width (1-4 sec) in a baseband state. In addition, communications according to the UWB communication protocol may refer to a band itself to which the UWB communication protocol is applied.

Hereinbelow, for the convenience of explanation, descriptions will be made with reference to a UWB signal as the signal exchanged between the control device and the terminal, but the disclosure is not limited thereto. Descriptions of the disclosure may be applied to signals according to other communication protocols (for example, signals by a BLE communication protocol) between the control device and the terminal in addition to UWB signals.

In an embodiment, the control device and the terminal may perform a discovery process therebetween, a link generation process and a data communication process.

In the discovery process, the control device and the terminal may discover a device capable of communication among devices positioned in the proximity thereof. Through the discovery process, the control device and the terminal may discover each other. For example, the terminal may transmit a discovery signal to the control device, and the control device may receive the discovery signal from the terminal. In this case, the control device may identify that the terminal is positioned in the proximity thereof, and may transmit a response signal to the terminal. Conversely, the control device may transmit a discovery signal and the terminal may receive the discovery signal, and then, the terminal may transmit a response signal to the control device.

In addition, in the link generation process, the control device and the terminal may generate a link for data communication with a device that they intend to perform data communication with among the discovered devices. For example, the control device may generate a link for transmitting data to the terminal.

In addition, in the data communication process, the control device and the terminal may exchange data with the devices for which links are generated in the link generation process. For example, the control device and the terminal may exchange data with each other through the generated link.

In an embodiment, a UWB signal that the control device and the terminal exchange with each other may include a plurality of packets, and each of the plurality of packets may include a sync field. A packet structure of a UWB signal will be described below with reference to FIG. 7.

Figure 7:
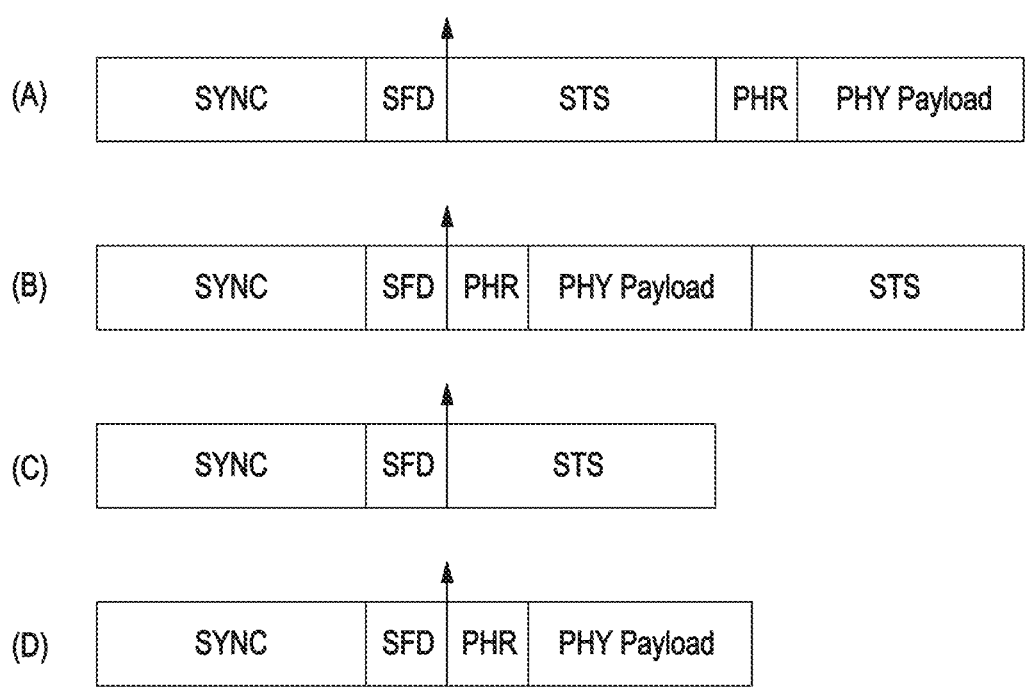
FIG. 7 is a view provided to explain a packet structure of a UWB signal according to an embodiment.

(A) of FIG. 7 is a view illustrating a packet structure of a UWB signal according to an embodiment. (B) of FIG. 7 is a view illustrating a packet structure of a UWB signal according to an embodiment. (C) of FIG. 7 is a view illustrating a packet structure of a UWB signal according to an embodiment. (D) of FIG. 7 is a view illustrating a packet structure of a UWB signal according to an embodiment.

Referring to FIG. 7, a packet structure of a UWB signal may be divided into a high rate pulse (HRP) mode and a low rate pulse (LRP) mode which have different data transfer rates and transmission ranges. The HRP mode and the LRP mode may be distinguished from each other with reference to the number of pulses of a UWB signal. A UWB signal of the LRP mode may have a higher output than a UWB signal of the HRP mode, but may have a smaller number of pulses. A UWB signal of the HRP mode may have a larger number of pulses than A UWB signal of the LRP mode, but may have a lower output. Accordingly, the HRP mode may be widely used in a terminal like a smartphone. A packet structure of a UWB signal according to the HRP mode will be described.

(A) of FIG. 7 illustrates a HRP mode 1, (B) of FIG. 7 illustrates a HRP mode 2, and (C) of FIG. 7 illustrates a HRP mode 3, and the frame of the UWB signal in (A), (B) and (C) of FIG. 7 may include a scrambled timestamp sequence (STS) field. (D) of FIG. 7 illustrates a HRP mode 0 which does not include an STS field.

In (A) of FIG. 7, the packet of the UWB signal may include a sync field, a start of frame delimiter (SFD) field, an STS field, a physical layer header (PHR) field, and a PHY payload field.

A preamble code may be repeatedly included in the sync field. A size of the frame of the UWB signal may be determined based on a length of the sync field.

The SFD field may indicate a data rate, and a short length of the SFD field may indicate a normal data rate, and a long length of the SFD field may indicate a slow data rate.

In addition, a RMARKER may be positioned in the first chip or symbol generated after the SFD field. In FIG. 7, the RMAKER may be expressed by arrows. The RMAKER may indicate a timing to measure a distance.

The PHR field may include information on a data rate of a received PHY payload field, a current frame length, etc. In an embodiment, a UWB signal including a ranging frame RFRAME between devices may be included to measure positions between devices. In this case, the PHR field included in the ranging frame may include a ranging bit (ranging field).

A PHY service data unit (PSDU) which is data transmitted between physical layers may be included in the PHY payload field.

The STS field may be included in the frame of the UWB signal according to a mode. The STS field may be an encrypted sequence that is known only to two devices exchanging data, that is, to the control device and the terminal.

The STS field may be used to distinguish between data that is received after being reflected from an external obstacle and data that is directly received from a device. In addition, the STS field may include an STS seed and an STS index.

Referring back to FIG. 6, the control device may determine whether the terminal is positioned in the first direction or the second direction, based on the signal received from the terminal (S200). The terminal may also determine whether the control device is positioned in the first direction or the second direction, based on a signal received from the control device. Hereinbelow, for the convenience of explanation, it will be illustrated that the control device determines whether the terminal is positioned in the first direction or the second direction, but this should not be considered as limiting. The terminal may also determine whether the control device is positioned in the first direction or the second direction.

In an embodiment, at step S200, the control device may determine whether the terminal is positioned in the first direction or the second direction, based on a change in the strength and the phase angle of the signal received from the terminal. As described above, the control device may receive a UWB signal from the terminal, and the UWB signal may include a plurality of packets. In addition, each of the plurality of packets may include a sync field. The control device may acquire channel impulse response (CIR) data of the signal received from the terminal through correlation calculation on the sync field included in each of the plurality of packets.

Specifically, the sync field may be formed by repetition of UWB symbols. For example, the number of UWB symbols of the sync field may be selected from 16, 64, 1024, 4096. One UWB symbol may use a code that is comprised of 31 or 127 UWB pulses (or chips). The code may be any one of three types of 1, 0, −1, 1 may indicate a UWB pulse having a positive size, −1 may indicate a UWB pulse having a negative size, and 0 may indicate that there is no UWB pulse. The control device may perform auto correlation calculation on the UWB symbol, and correlation characteristics according to the auto correlation calculation may be a CIR. The correlation characteristics on the UWB symbol may indicate that every UWB symbol may have one value and the terminal may repeatedly transmit the UWB symbol in the sync field in order to increase a distance resolution, and accordingly, the control device may acquire a plurality of CIRs through auto correlation calculation on the plurality of UWB symbols. Under the same wireless environment, the CIR of each UWB symbol may be the same, but there is actually a minimal change of the inner clock in the control device, and therefore, a sampling moment of the CIR may also change and thus the CIR may change. In the detailed descriptions of the disclosure, such CIRs may be expressed by CIR data. The CIR data may indicate data integrating a plurality of CIRs or may indicate data resulting from processing of a plurality of CIRs in a statistic technique. As described above, the control device may acquire CIR data.

In addition, according to an embodiment, the control device may acquire CIR data of the signal received from the terminal through correlation calculation on the STS field included in each of the plurality of packets. For example, the STS field may be an encrypted sequence as described above, and in other words, the STS field in the UWB signal may be formed of an encrypted pulse sequence. The control device may acquire CIR data through a correlation calculation process with a waveform of the STS field calculated by the control device.

In addition, the CIR data may include an in-phase component and a quadrature-phase component. Specifically, the communication module of the terminal may include a transmitter, and the terminal may up-convert a frequency into a UWB channel by multiplying the UWB symbol signal by a carrier frequency and may transmit a UWB signal by using the transmitter. The communication module of the control device may include a receiver having an IQ demodulator structure, and the control device may down-convert a frequency of a UWB signal received from the terminal by using the receiver, thereby generating a reception signal on a I channel and a reception signal on a Q channel. The control device may acquire a cross correlation function of the reception signal on the I channel and a transmission signal from the terminal by performing correlation calculation on the reception signal on the I channel, and may acquire a cross correlation function of the reception signal on the Q channel and the transmission signal from the terminal by performing correlation calculation on the reception signal on the Q channel. The cross correlation function of the reception signal on the I channel and the transmission signal from the terminal may become an in-phase component of the CIR data, and the cross correlation function of the reception signal on the Q channel and the transmission signal from the terminal may become a quadrature-phase component of the CIR data. Accordingly, the CIR data acquired based on the UWB signal received by the control device may be expressed in the form of a complex number.

More specifically, the UWB signal transmitted by the terminal may be expressed as shown in Equation 1 presented below:

$$s(t) = m(t)\cos(2\pi f_c t) \qquad \text{[Equation 1]}$$

where s(t) is the UWB signal transmitted from the terminal, m(t) is a UWB symbol signal, and $f_c$ is a carrier frequency.

In addition, the reception signal on the I channel in the control device may expressed as shown in Equation 2 presented below:

$$I(t) = m(t)\cos(2\pi \Delta f t + \Delta\emptyset) \qquad \text{[Equation 2]}$$

where I(t) is the reception signal on the I channel, m(t) is a UWB symbol signal, Δf is a frequency error, and ΔØ is a phase error. As described above, the reception signal on the I channel may vary with m(t) which is the UWB symbol signal according to a frequency error and a phase error. In order to reduce the frequency error and the phase error, the reception signal on the Q channel that has quadrature-phase characteristics may be required. The reception signal on the Q channel in the control device may be expressed as shown in Equation 3 presented below:

$$Q(t) = m(t)\sin(2\pi \Delta f t + \Delta\emptyset) \qquad \text{[Equation 3]}$$

where Q(t) is the reception signal on the Q channel, m(t) is a UWB symbol signal, Δf is a frequency error, and ΔØ is a phase error.

In addition, the control device may calculate a size of a signal as shown in Equation 4. Accordingly, the control device may accurately demodulate the UWB symbol signal regardless of the frequency error and the phase error.

$$\sqrt{I^2(t) + Q^2(t)} = m(t) \qquad \text{[Equation 4]}$$

In addition, if the auto correlation function of the transmission signal m(t) from the terminal is $\Phi_m(\tau)$, the cross correlation function of the reception signal on the I channel and m(t) of Equation 2 may be expressed as shown in Equation 5 presented below:

$$\Phi_{Im}(t, \tau) = \Phi_m(\tau)\cos(\Delta\omega t + \Delta\emptyset) \qquad \text{[Equation 5]}$$

where $\Phi_{Im}(t, \tau)$ is the cross correlation function of the reception signal on the I channel and m(t), $\Delta\omega$ is a frequency error, and $\Delta\emptyset$ is a phase error. As described above, correlation characteristics of the I signal may be addition of the frequency error and the phase error to the auto correlation function $\Phi_m(\tau)$.

In addition, the cross correlation function of the reception signal on the Q channel and m(t) of Equation 2 may be expressed as shown in Equation 6 presented below:

$$\Phi_{Qm}(t, \tau) = \Phi_m(\tau)\sin(\Delta\omega t + \Delta\emptyset) \qquad \text{[Equation 6]}$$

where $\Phi_{Qm}(t, \tau)$ is the cross correlation function of the reception signal on the Q channel and m(t), $\Delta\omega$ is a frequency error, and $\Delta\emptyset$ is a phase error.

In addition, Equation 7 may be derived from Equation 5 and Equation 6:

$$\sqrt{\Phi_{Im}^2(t, \tau) + \Phi_{Qm}^2(t, \tau)} = \Phi_m(\tau) \qquad \text{[Equation 7]}$$

where $\Phi_{Im}(t, \tau)$ is the cross correlation function of the reception signal on the I channel and m(t), $\Phi_{Qm}(t, \tau)$ is the cross correlation function of the reception signal on the Q channel and m(t), and $\Phi_m(\tau)$ is the auto correlation function of the transmission signal m(t) from the terminal. When the reception signal on the I channel of the CIR data and the reception signal on the Q channel are used as shown in FIG. 7, the auto correlation function of the transmission signal from the terminal may not be influenced by the frequency error and the phase error of the CIR data.

In an embodiment, the control device may estimate a distance to the terminal by using the CIR data. Specifically, the control device may acquire a plurality of pieces of CIR data (for example, 1,016) every time it receives one packet. In this case, CIR data whose size (for example, a size of the auto correlation function of the transmission signal from the terminal) exceeds a predetermined threshold for the first time among the plurality of pieces of data may be expressed by FP_INDEX. The control device may estimate a reception signal strength of the UWB signal by using the sizes of a predetermined number (for example, 3) of pieces of CIR data after FP_INDEX. The reception signal strength of the UWB signal may be expressed as shown in Equation 8 presented below:

$$RSS = 10\log_{10}((F_1^2 + F_2^2 + F_3^2)/(N^2)) + 6D - A \qquad \text{Equation 8}$$

where RSS is the reception signal strength of the UWB signal, $F_1$, $F_2$, $F_3$ are the sizes of three pieces of CIR data after FP_INDEX, N is the number of UWB symbols of the sync filed, D is a value related to tuning of the receiver of the communication module of the control device, and A is an offset value.

The control device may estimate the distance to the terminal by using the reception signal strength of the UWB signal.

At step S200, the control device may generate an IQ plot on the CIR data. As described above, the CIR data may include the cross correlation function of the reception signal on the I channel and the transmission signal from the terminal, and the cross correlation function of the reception signal on the Q channel and the transmission signal from the terminal, which become an in-phase component and a quadrature-phase component of the CIR data, respectively. The control device may generate the IQ plot by placing the in-phase component of the CIR data on the X-axis and placing the quadrature phase component of the CIR data on the Y-axis. In the IQ plat, one piece of CIR data may be expressed by one point according to the in-phase component and the quadrature-phase component. This will be described below with reference to FIGS. 8A, 8B, 8C, 8D, and FIGS. 9A, 9B, 9C, 9D.

Figure 8A:
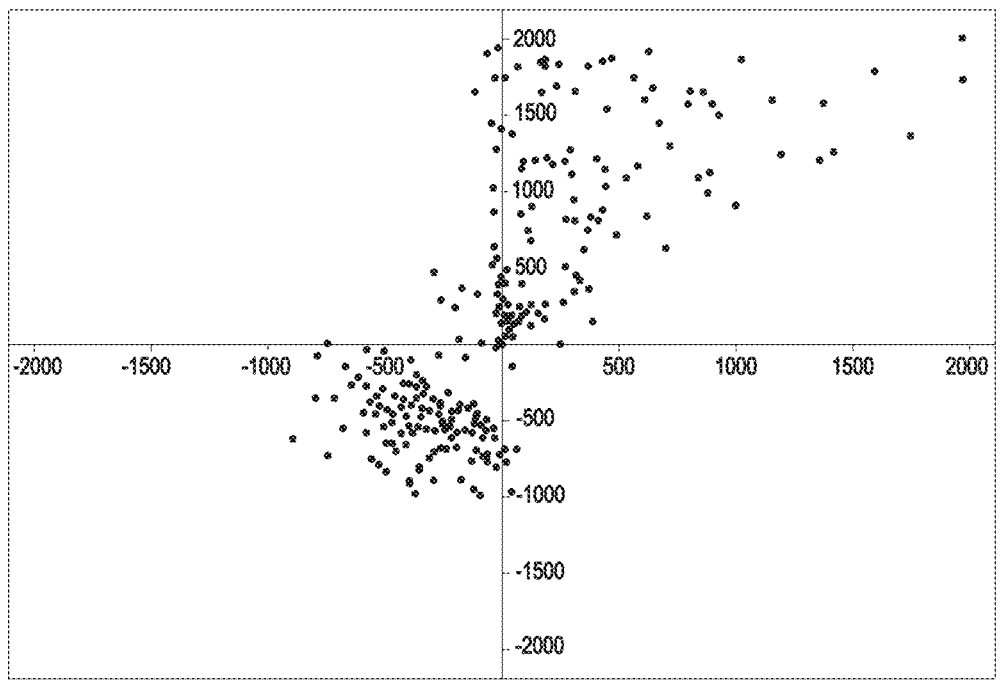
FIG. 8A is a view provided to explain an IQ plot according to an embodiment.
Figure 8B:
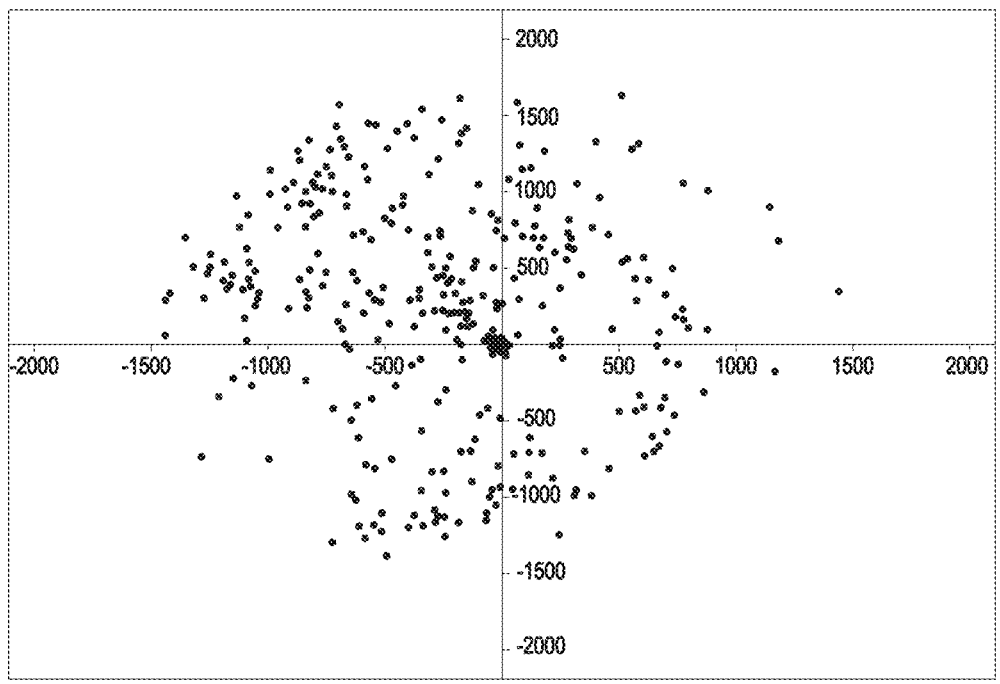
FIG. 8B is a view provided to explain an IQ plot according to an embodiment.
Figure 8C:
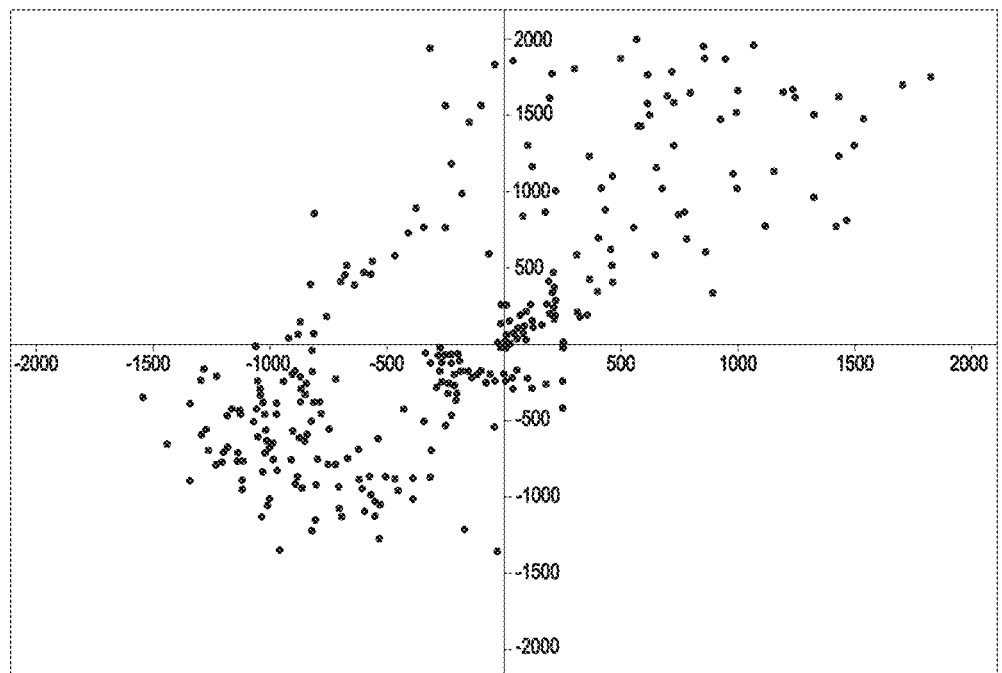
FIG. 8C is a view provided to explain an IQ plot according to an embodiment.
Figure 8D:
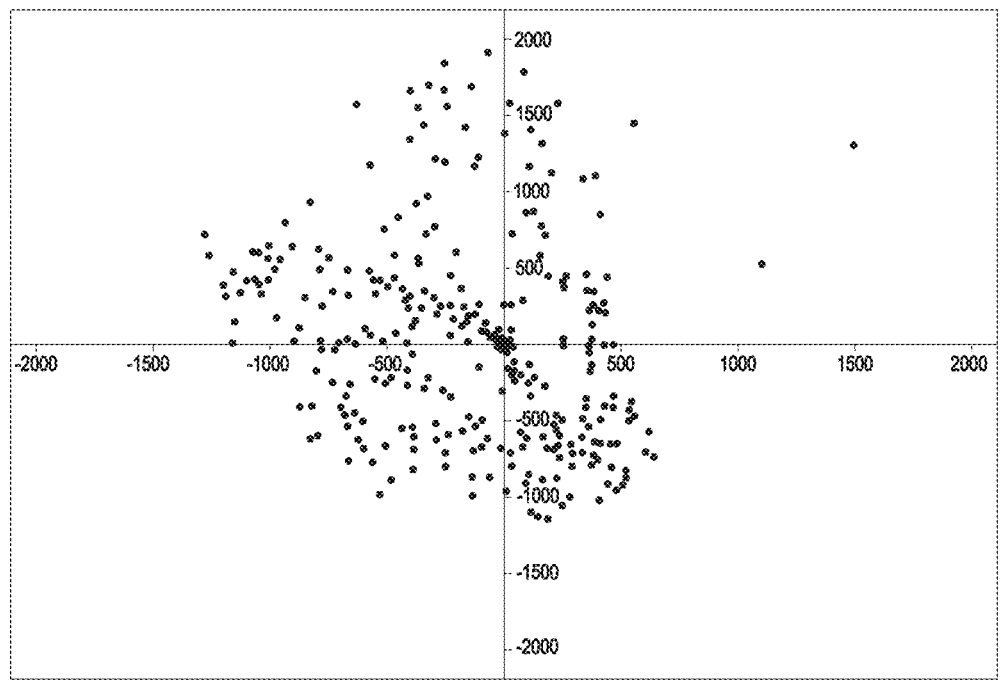
FIG. 8D is a view provided to explain an IQ plot according to an embodiment.
Figure 9A:
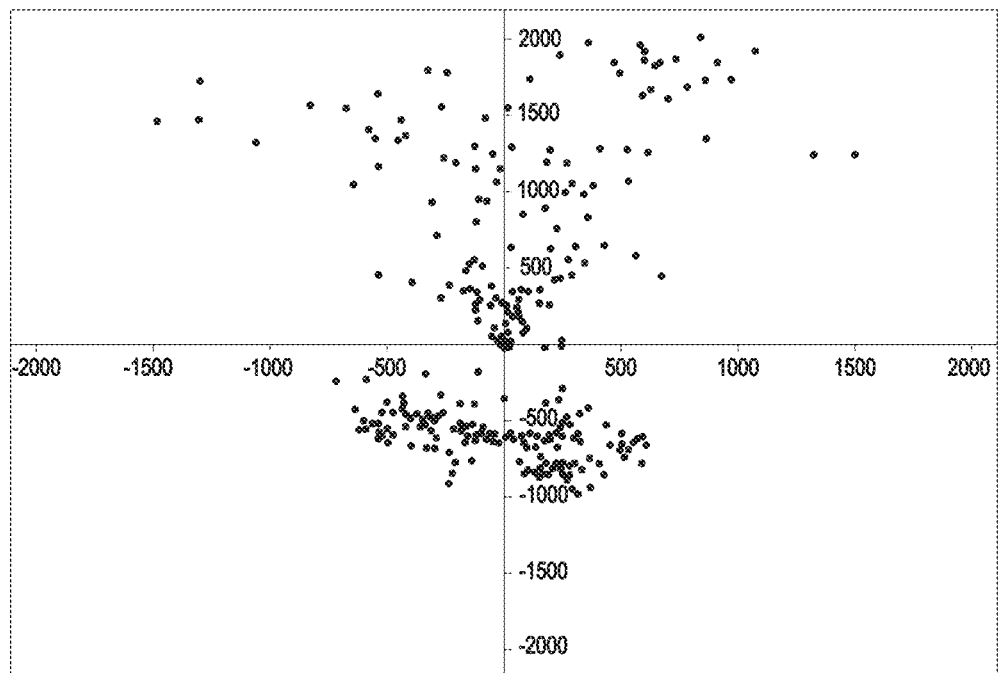
FIG. 9A is a view provided to explain an IQ plot according to an embodiment.
Figure 9B:
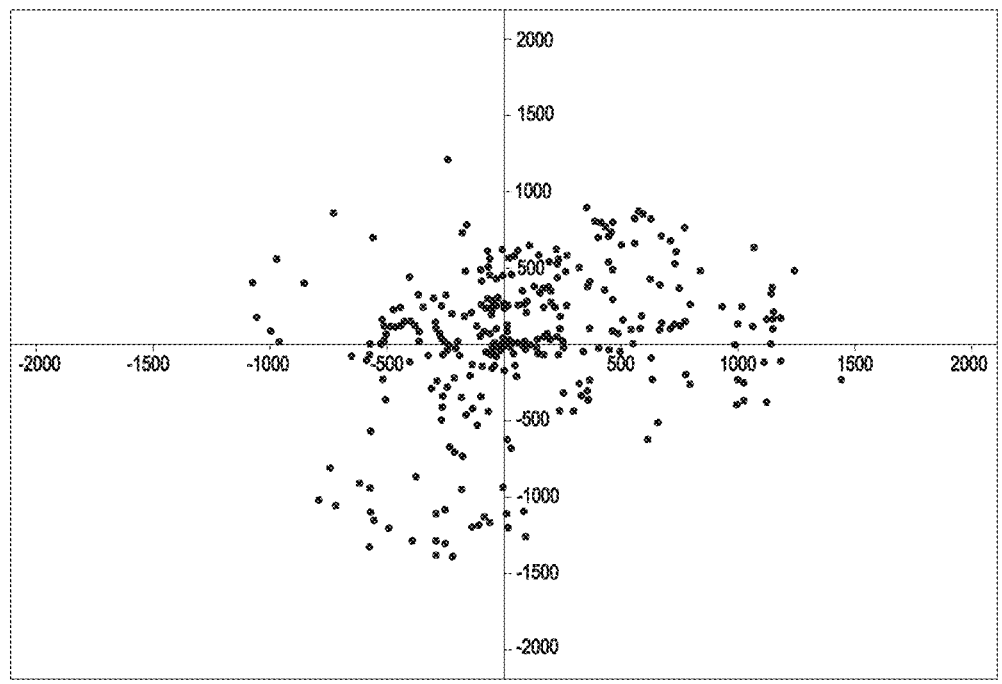
FIG. 9B is a view provided to explain an IQ plot according to an embodiment.
Figure 9C:
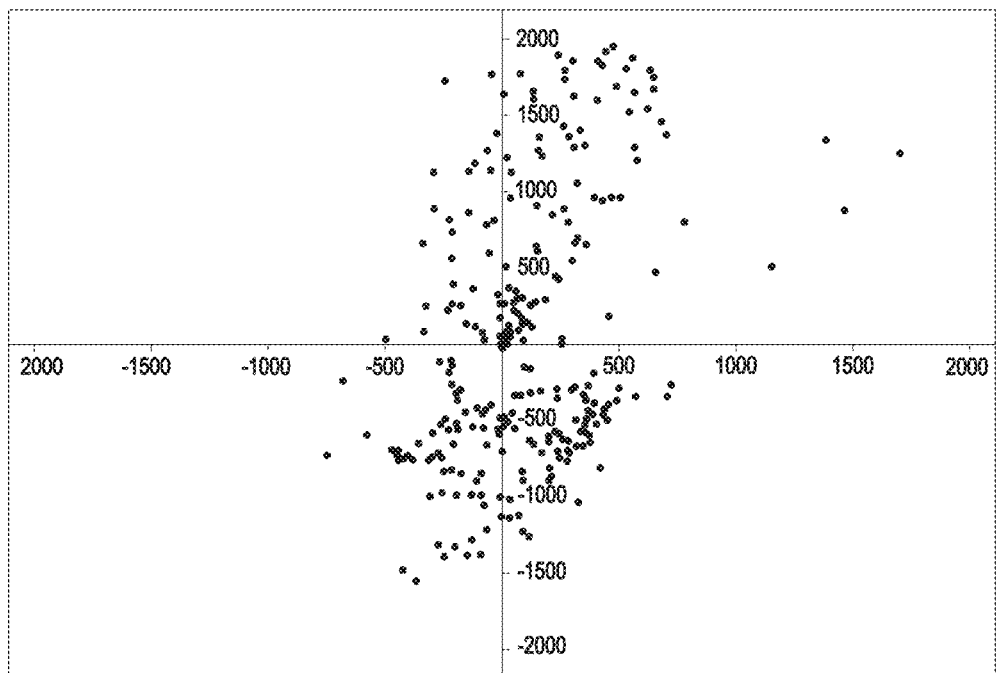
FIG. 9C is a view provided to explain an IQ plot according to an embodiment.
Figure 9D:
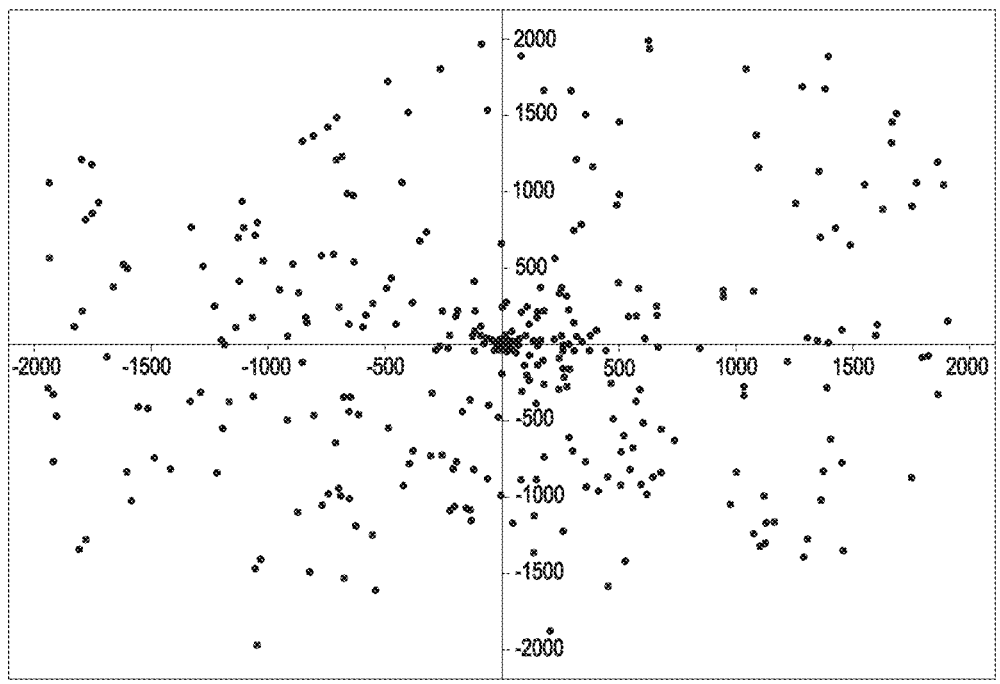
FIG. 9D is a view provided to explain an IQ plot according to an embodiment.

FIG. 8A is a view provided to explain an IQ plot according to an embodiment, FIG. 8B is a view provided to explain an IQ plot according to an embodiment, FIG. 8C is a view provided to explain an IQ plot according to an embodiment, FIG. 8D is a view provided to explain an IQ plot according to an embodiment, FIG. 9A is a view provided to explain an IQ plot according to an embodiment, FIG. 9B is a view provided to explain an IQ plot according to an embodiment, FIG. 9C is a view provided to explain an IQ plot according to an embodiment, FIG. 9D is a view provided to explain an IQ plot according to an embodiment. In the graphs of FIGS. 8A, 8B, 8C, 8D and FIG. 9A, 9B, 9C, 9D, the X-axis indicates the in-phase component of CIR data and the Y-axis may indicate the quadrature-phase component of CIR data.

Referring to FIGS. 8A, 8B, 8C, 8D, FIG. 8A illustrates an IQ plot when a control device and a first terminal are spaced apart from each other by 1 meter and the first terminal is positioned in a first direction (that is, a direction from a substrate of the control device to an antenna of the control device), and FIG. 8B illustrates an IQ plot when the control device and the first terminal are spaced apart from each other by 1 meter and the first terminal is positioned in a second direction (that is, a direction from the substrate of the control device to a ground of the control device).

FIG. 8C illustrates an IQ plot when the control device and a second terminal are spaced apart from each other by 1 meter and the second terminal is positioned in the first direction, and FIG. 8D illustrates an IQ plot when the control device and the second terminal are spaced apart from each other by 1 meter and the second terminal is positioned in the second direction. Herein, the first terminal and the second terminal are different terminals, and for example, the first terminal may be a terminal operating by Android, and the second terminal may be a terminal operating by iOS.

Referring to FIGS. 9A, 9B, 9C, 9D, FIG. 9A illustrates an IQ plot when the control device and the first terminal are spaced apart from each other by 2 meters and the first terminal is positioned in the first direction, and FIG. 9B illustrates an IQ plot when the control device and the first terminal are spaced apart from each other by 2 meters and the first terminal is positioned in the second direction.

FIG. 9C illustrates an IQ plot when the control device and the second terminal are spaced apart from each other by 2 meters and the second terminal is positioned in the first direction, and FIG. 9D illustrates an IQ plot when the control device and the second terminal are spaced apart from each other by 2 meters and the second terminal is positioned in the second direction.

In addition, the control device may acquire density of CIR data existing in each quadrant in the IQ plot. The control device may estimate a direction in which the terminal is positioned, based on density of CIR data existing each quadrant in the IQ plot.

Specifically, the control device may calculate an angle value of CIR data existing in each quadrant. For example, the control device may calculate an angle value formed by a boundary line between the first quadrant and the fourth quadrant and each CIR data. In addition, the control device may calculate a statistical value on a distribution of angle values of CIR data. For example, the control device may calculate a mean on the distribution of angle values of CIR data in each quadrant, and may calculate a variance and/or standard deviation of angle values of CIR data in each quadrant, based on the mean. The control device may set the variance and/or standard deviation of angle values of CIR data in each quadrant as a reference of density, and may estimate a direction in which the terminal is positioned, based on the variance and/or standard deviation of angle values of CIR data in each quadrant. For example, when the variance and/or standard deviation of angle values of CIR data in each quadrant is less than a pre-defined threshold value, the control device may determine that the terminal is positioned in the first direction, and, when the variance and/or standard deviation is greater than or equal to the pre-defined threshold value, the control device may determine that the terminal is positioned in the second direction. As described above, when the terminal is positioned in the second direction, radio interference may occur in the UWB signal exchanged between the control device and the terminal due to the ground, and due to the radio interference, there may be a difference between the UWB signal exchanged between the control device and the terminal when the terminal is positioned in the second direction, and the UWB signal exchanged between the control device and the terminal when the terminal is positioned in the first direction. The difference in the UWB signals may appear as a difference in the density of CIR data existing in each quadrant of the IQ plot, that is, a change in the variance and/or standard deviation of angle values of CIR data in each quadrant. The pre-defined threshold value is a reference of such a difference, and therefore, the control device may determine whether the terminal is positioned in the first direction or the second direction, by using the variance and/or standard deviation of angle values of CIR data in each quadrant and the pre-defined threshold value.

In an embodiment, the control device may extract predetermined CIR data from the whole CIR data based on a position of CIR data in the IQ plot in order to increase the accuracy of positioning, and may determine whether the terminal is positioned in the first direction or the second direction, based on the density of the predetermined CIR data. Specifically, the control device may select CIR data whose distance to the origin of the IQ plot is greater than or equal to a predetermined distance from the whole CIR data, and may determine whether the terminal is positioned in the first direction or the second direction, based on the density of the selected CIR data. This is because as the terminal is closer to the control device, the distance between the origin of the IQ plot and the CIR data is shorter. When the terminal is positioned close to the control device, the degree of radio interference depending on the position of the terminal is smaller and thus there is a high probability that an error occurs in finding a direction in the control device. Since the above-described contents may be applied to calculating the density of selected CIR data and finding a direction of the terminal, detailed descriptions are omitted.

In addition, in an embodiment, the control device may select a predetermined number of quadrants among the four quadrants of the IQ plot in order to increase the accuracy of positioning, and may determine whether the terminal is positioned in the first direction or the second direction, based on the density of CIR data in the selected quadrant. This will be described below with reference to FIGS. 10A, 10B, 10C, 10D, and FIGS. 11A, 11B, 11C, 11D.

Figure 10A:
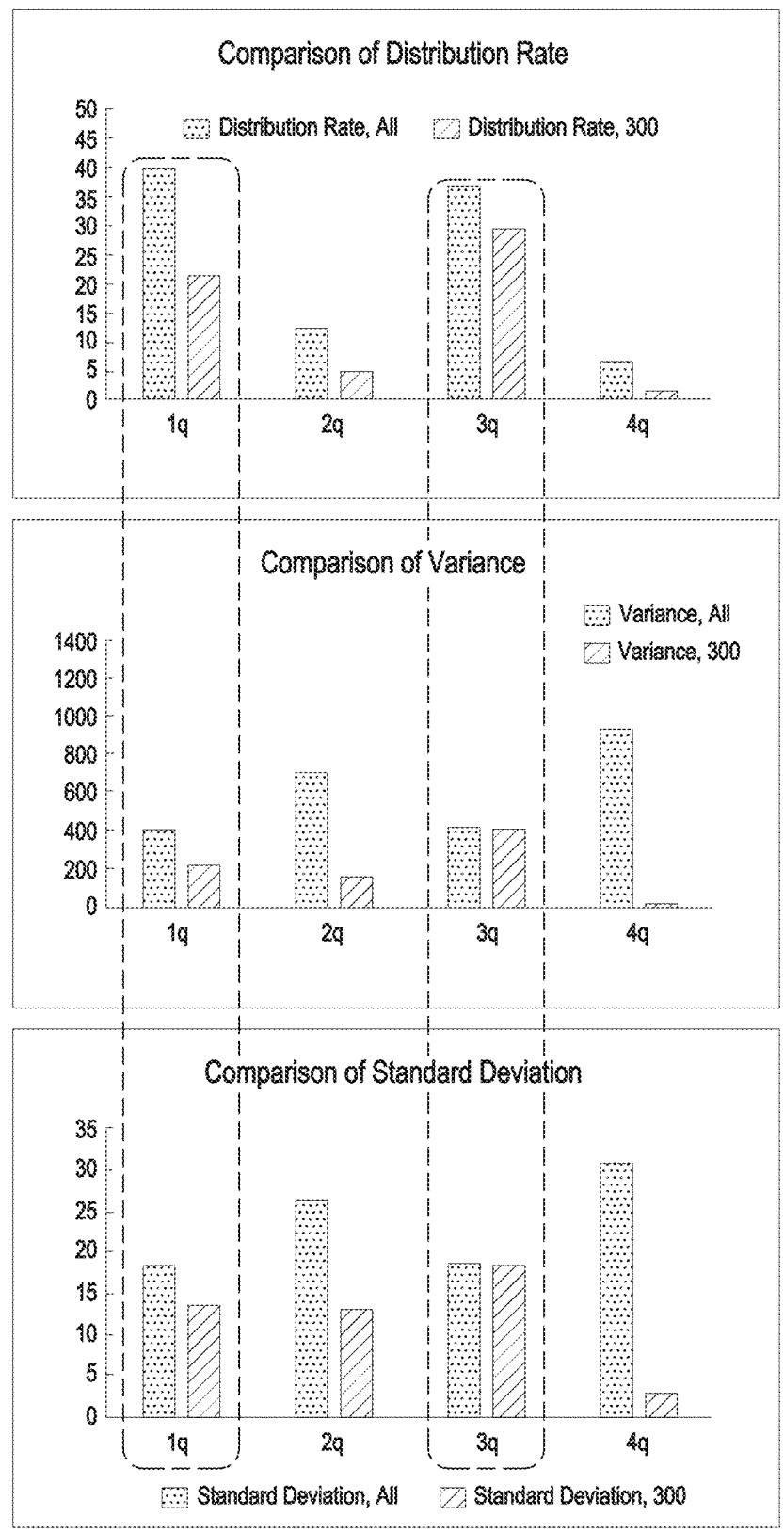
FIG. 10A is a view provided to explain a direction-finding method of a control device for a terminal according to an embodiment.
Figure 10B:
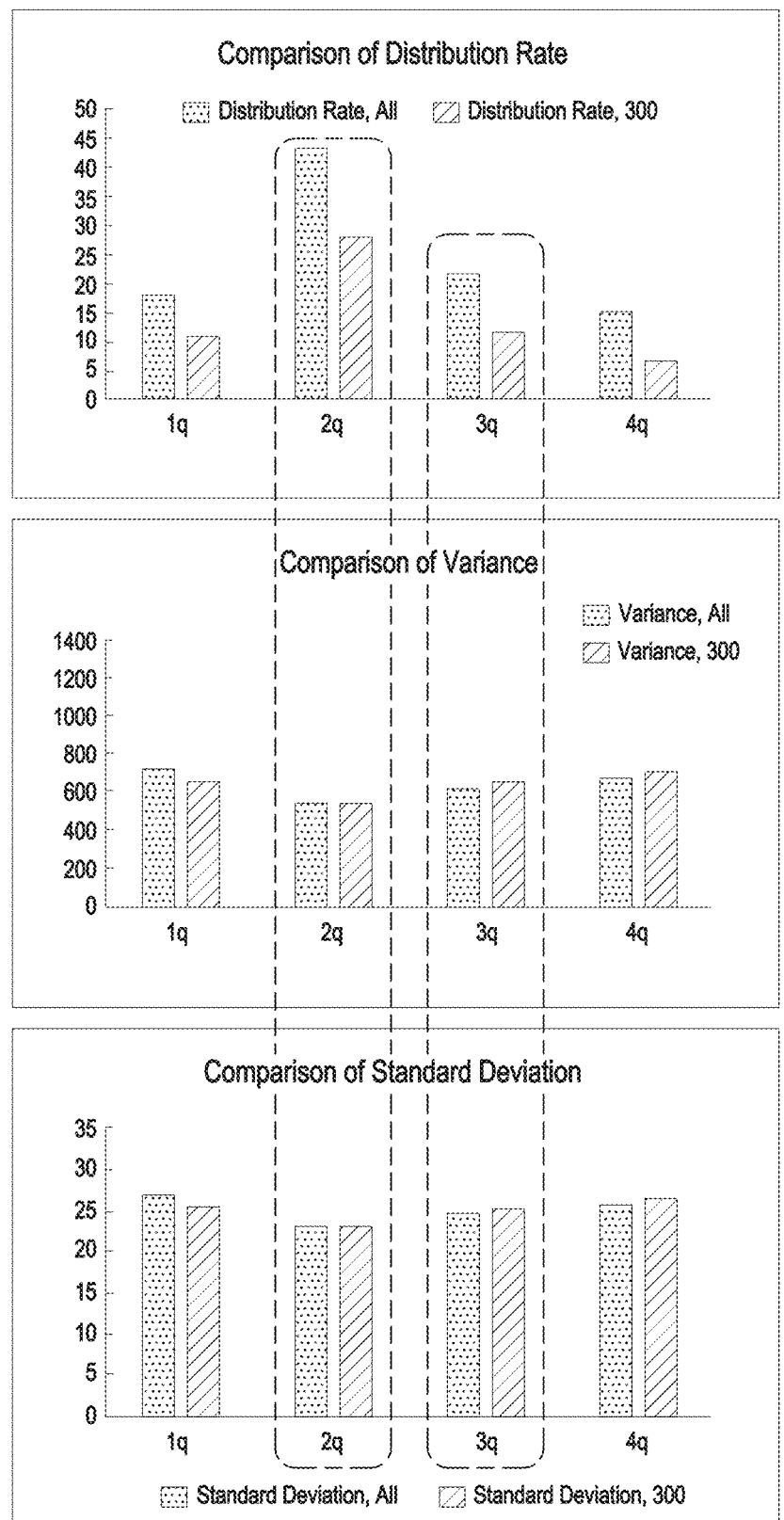
FIG. 10B is a view provided to explain a direction-finding method of a control device for a terminal according to an embodiment.
Figure 10C:
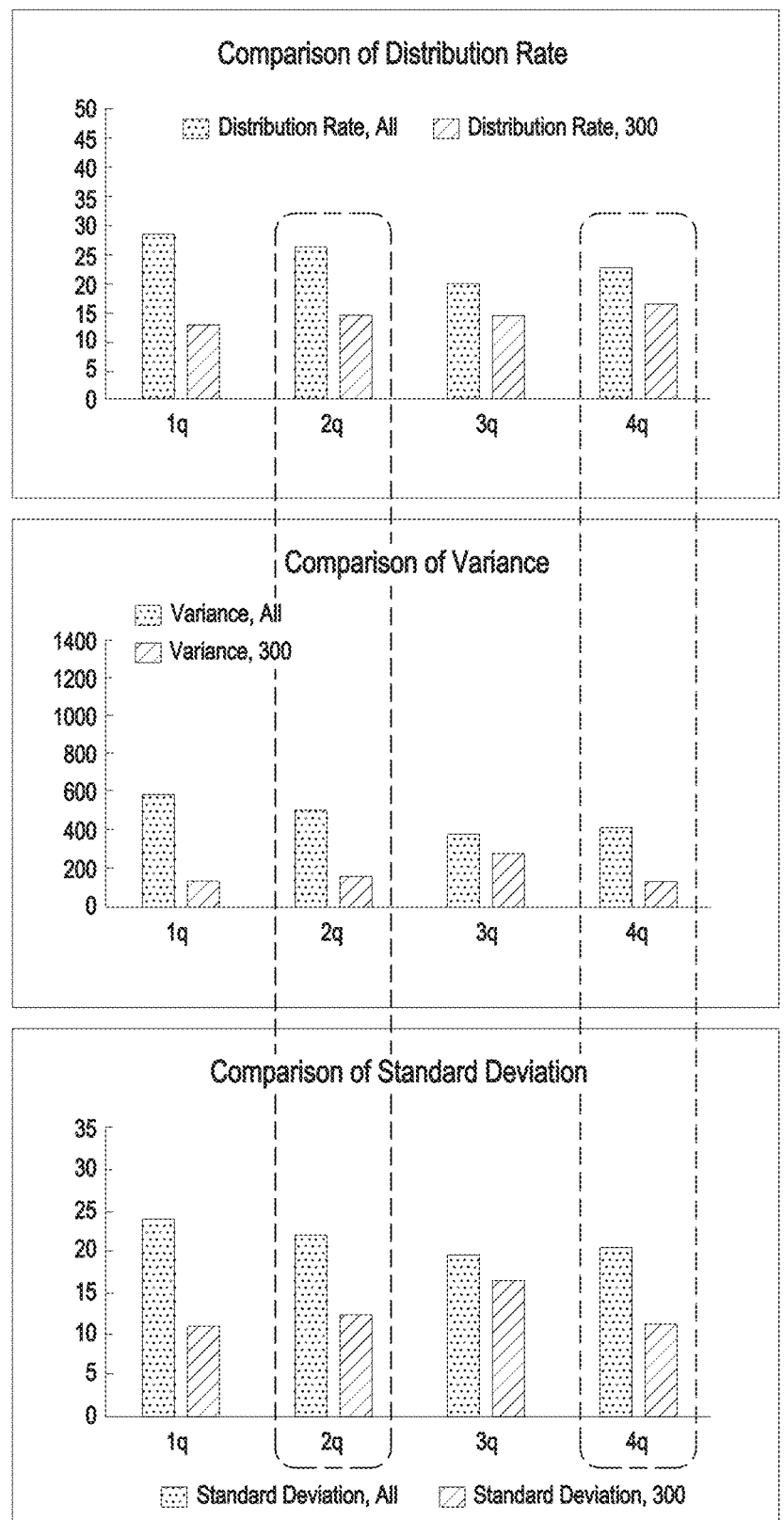
FIG. 10C is a view provided to explain a direction-finding method of a control device for a terminal according to an embodiment.
Figure 10D:
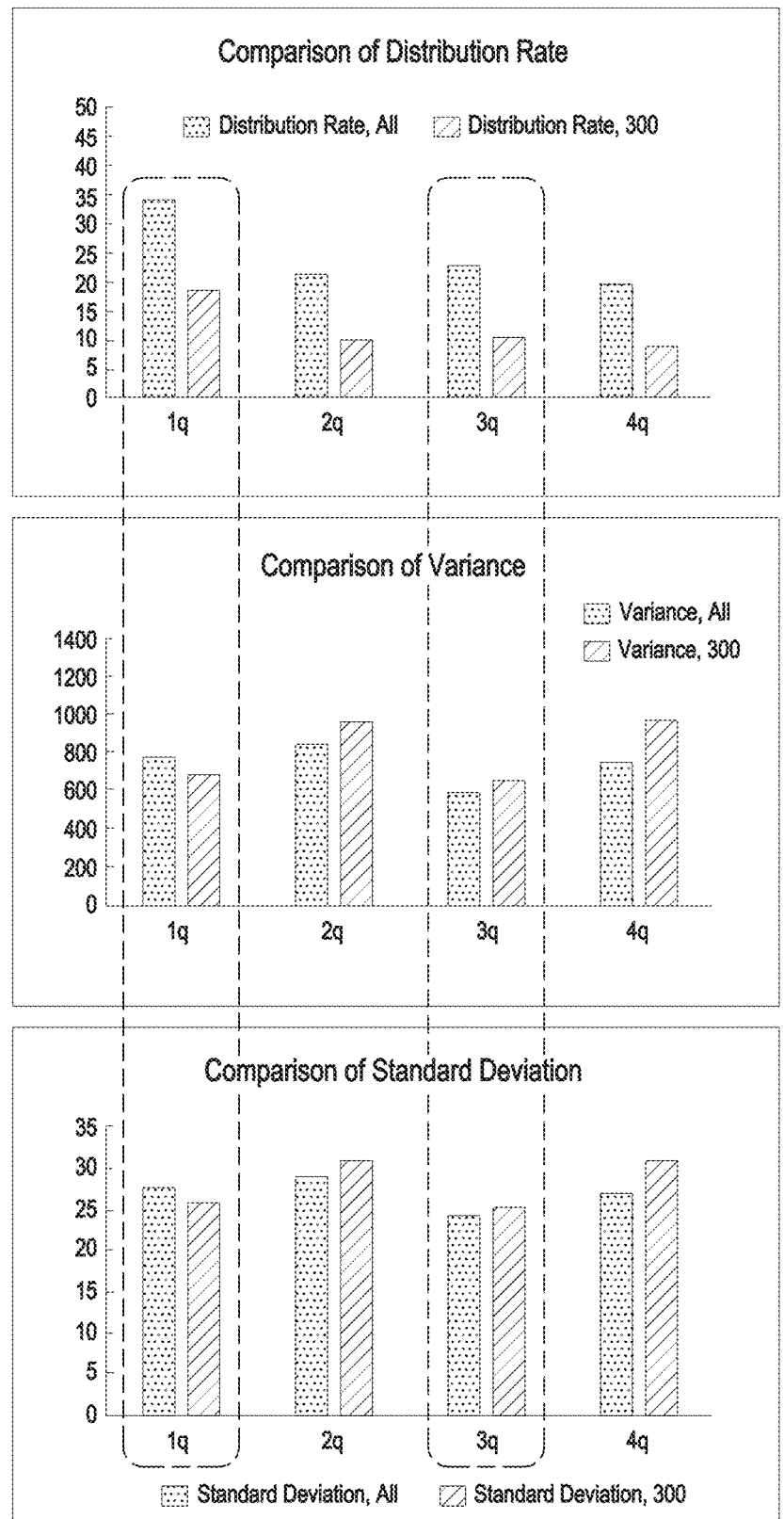
FIG. 10D is a view provided to explain a direction-finding method of a control device for a terminal according to an embodiment.
Figure 11A:
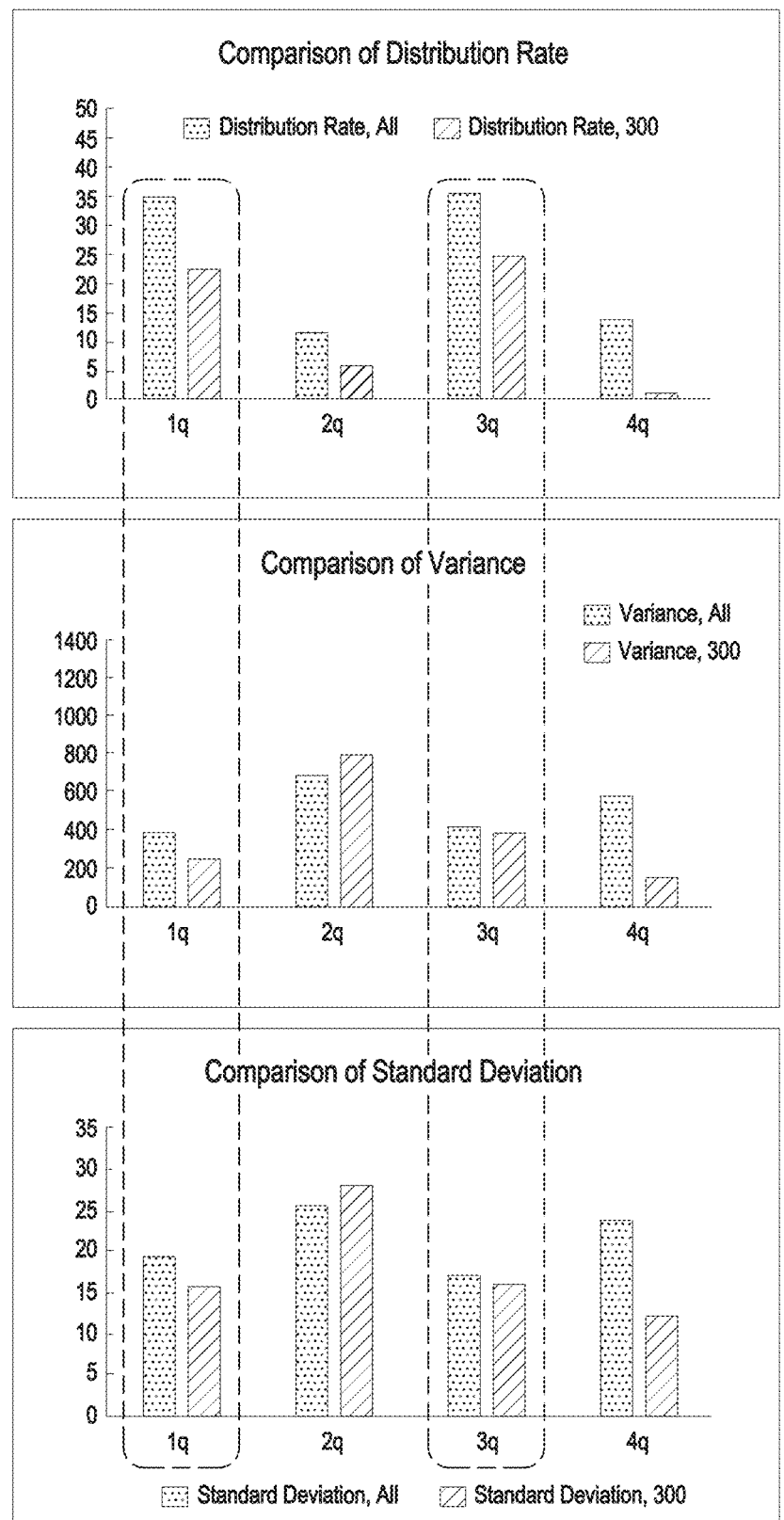
FIG. 11A is a view provided to explain a direction-finding method of a control device for a terminal according to an embodiment.
Figure 11B:
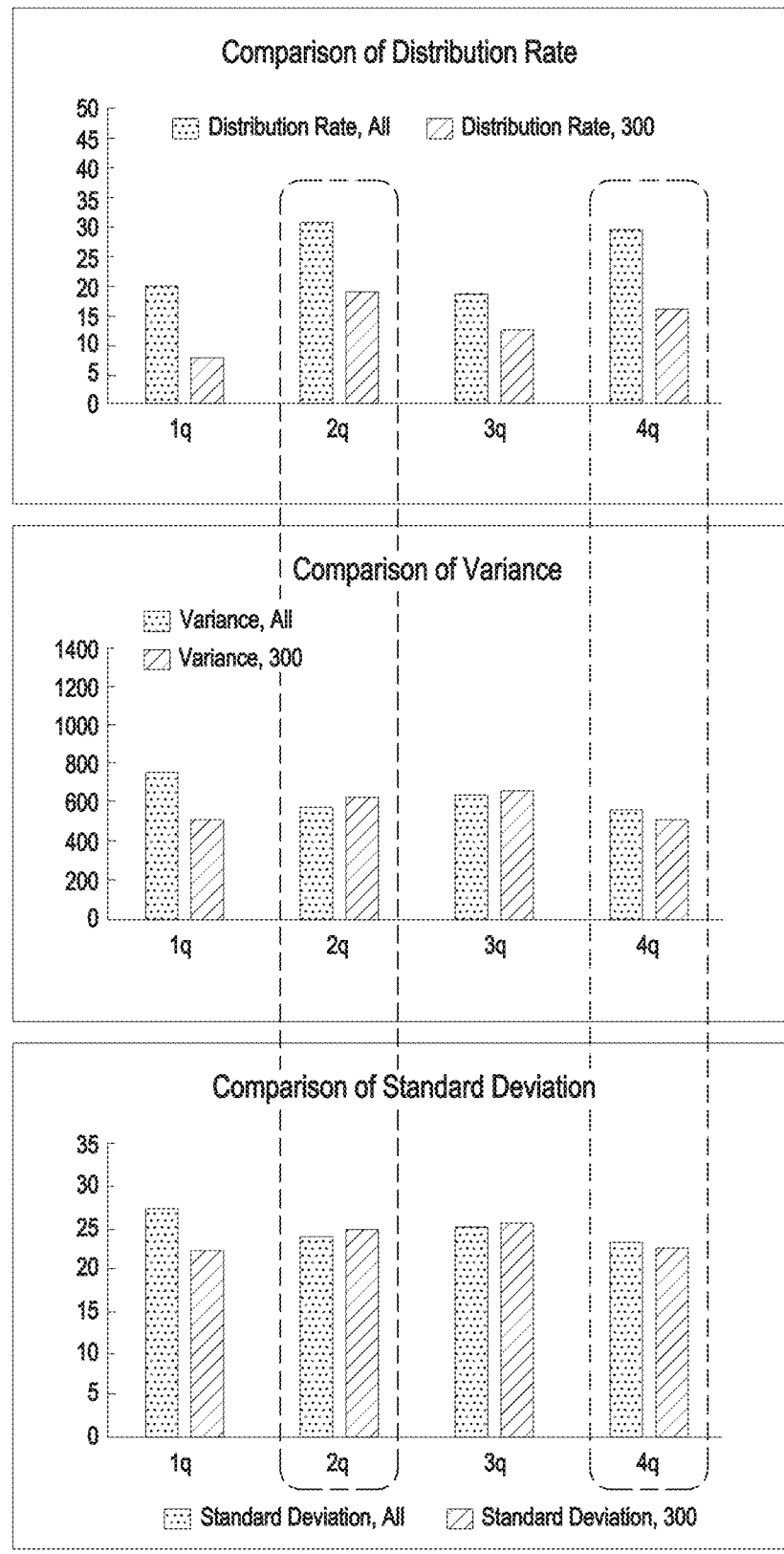
FIG. 11B is a view provided to explain a direction-finding method of a control device for a terminal according to an embodiment.
Figure 11C:
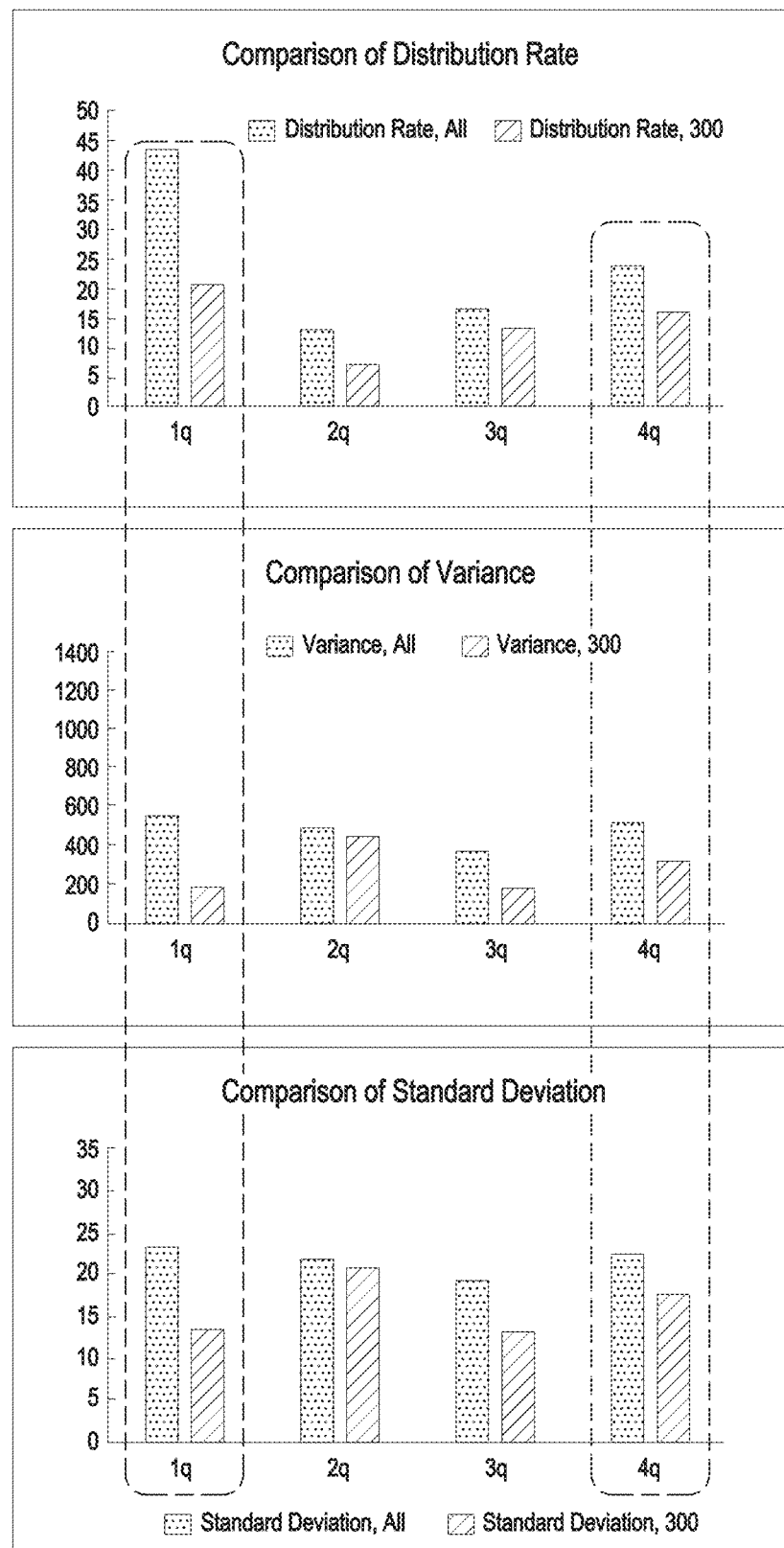
FIG. 11C is a view provided to explain a direction-finding method of a control device for a terminal according to an embodiment.
Figure 11D:
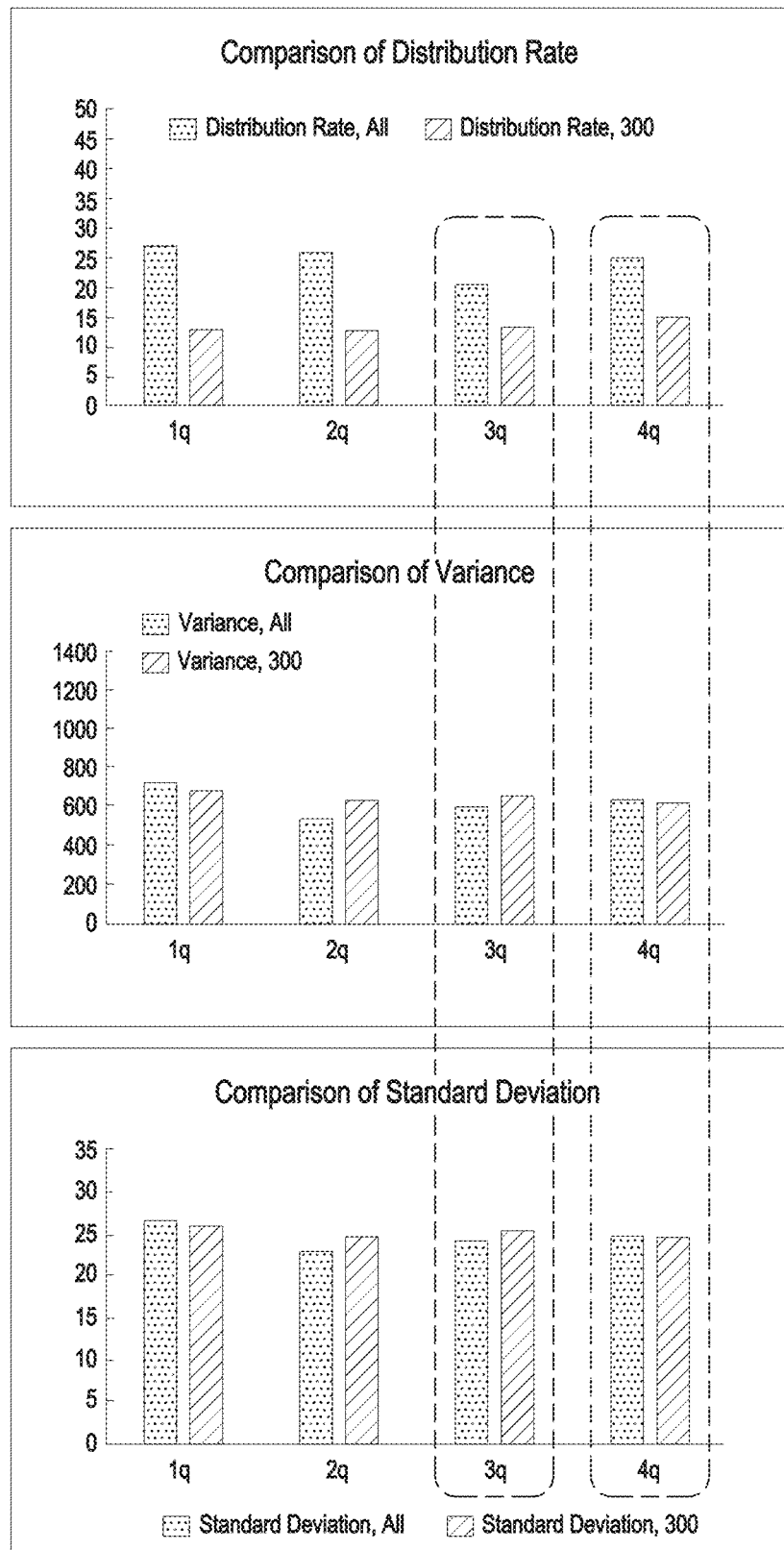
FIG. 11D is a view provided to explain a direction-finding method of a control device for a terminal according to an embodiment.

FIG. 10A is a view provided to explain a direction-finding method of a control device for a terminal according to an embodiment, FIG. 10B is a view provided to explain a direction-finding method of a control device for a terminal according to an embodiment, FIG. 10C is a view provided to explain a direction-finding method of a control device for a terminal according to an embodiment, FIG. 10D is a view provided to explain a direction-finding method of a control device for a terminal according to an embodiment, FIG. 11A is a view provided to explain a direction-finding method of a control device for a terminal according to an embodiment, FIG. 11B is a view provided to explain a direction-finding method of a control device for a terminal according to an embodiment, FIG. 11C is a view provided to explain a direction-finding method of a control device for a terminal according to an embodiment, and FIG. 11D is a view provided to explain a direction-finding method of a control device for a terminal according to an embodiment.

Referring to FIGS. 10A, 10B, 10C, 10D, graphs of FIG. 10A may correspond to the IQ plot of FIG. 8A, graphs of FIG. 10B may correspond to the IQ plot of FIG. 8B, graphs of FIG. 10C may correspond to the IQ plot of FIG. 9A, and graphs of FIG. 10D may correspond to the IQ plot of FIG. 9B. That is, the graphs of FIG. 10A may indicate the case in which the control device and the first terminal are spaced apart from each other by 1 meter and the first terminal is positioned in the first direction, the graphs of FIG. 10B may indicate the case in which the control device and the first terminal are spaced apart from each other by 1 meter and the first terminal is positioned in the second direction, the graphs of FIG. 10C may indicate the case in which the control device and the first terminal are spaced apart from each other by 2 meters and the first terminal is positioned in the first direction, and the graphs of FIG. 10D may indicate the case in which the control device and the first terminal are spaced apart from each other by 2 meters and the first terminal is positioned in the second direction.

In the graphs of FIGS. 10A, 10B, 10C, 10D, the X-axis indicates each quadrant. If the graphs of FIGS. 10A, 10B, 10C, 10D are referred to as the first, second, third graphs from the top graphs to the bottom graphs, the Y-axis of the first graphs of FIGS. 10A, 10B, 10C, 10D indicates a ratio of CIR data existing in each quadrant of the IQ plot, the Y-axis of the second graphs indicates a variance of angle values of CIR data in each quadrant, and the Y-axis of the third graphs indicates a standard deviation of angle values of CIR data in each quadrant.

In the graphs of FIGS. 10A, 10B, 10C, 10D, bars filled with dots indicate values related to the whole CIR data, and bars filled with diagonal lines indicate values related to CIR data selected based on a position of CIR data in the IQ plot. For example, the bars filled with diagonal lines indicate values related to CIR data whose distance to the origin in the IQ plot is 300 or more. Hereinafter, for the convenience of explanation, operations of the control device will be described based on the bars filled with diagonal lines, that is, values related to selected CIR data, but this should not be considered as limiting. The following descriptions may be applied to the bars filled with dots, that is, values related to the whole CIR data.

In an embodiment, the control device may select a predetermined number of quadrants from the four quadrants in the IQ plot. For example, in the case of the first graphs of FIG. 10A, the control device may select the first quadrant and the third quadrant in which the rate of CIR data is high. Likewise, the control device may select the second quadrant and the third quadrant in the case of FIG. 10B, may select the second quadrant and the fourth quadrant in the case of FIG. 10C, and may select the first quadrant and the third quadrant in the case of FIG. 10D.

In addition, the control device may calculate a mean on the distribution of angle values of CIR data in each quadrant, and may calculate a variance of angle values of CIR data in each quadrant, based on the mean. The variance of angle values of CIR data may be expressed by the second graphs of FIGS. 10A, 10B, 10C, 10D. In addition, the control device may calculate a standard deviation of angle values of CIR data in each quadrant, based on the variance of angle values of CIR data in each quadrant. The standard deviation of angle values of CIR data may be expressed by the third graphs of FIGS. 10A, 10B, 10C, 10D.

In addition, threshold values for the standard deviation of angle values of CIR data may be set in the control device. The control device may determine whether the first terminal is positioned in the first direction or the second direction by applying the threshold value to the standard deviation of angle values of CIR data. In the examples of FIGS. 10A, 10B, 10C, 10D, the threshold value may be set to 20. In the third graphs of FIGS. 10A and 10C, the standard deviation of angle values of CIR data in the two selected quadrants may be less than 20. Accordingly, in the case of FIGS. 10A and 10C, the control device may determine that the first terminal is positioned in the first direction.

On the other hand, in the third graphs of FIGS. 10B and 10D, the standard deviation of angle values of CIR data in the two selected quadrants may be 20 or more. Accordingly, the control device may determine that the first terminal is positioned in the second direction in the case of FIGS. 10B and 10D.

Referring to FIGS. 11A, 11B, 11C, 11D, graphs of FIG. 11A may correspond to the IQ plot of FIG. 8C, graphs of FIG. 11B may correspond to the IQ plot of FIG. 8D, graphs of FIG. 11C may correspond to the IQ plot of FIG. 9C, and graphs of FIG. 11D may correspond to the IQ plot of FIG. 9D. That is, the graphs of FIG. 11A may indicate the case in which the control device and the second terminal are spaced apart from each other by 1 meter and the second terminal is positioned in the first direction, the graphs of FIG. 11B may indicate the case in which the control device and the second terminal are spaced apart from each other by 1 meter and the second terminal is positioned in the second direction, the graphs of FIG. 11C may indicate the case in which the control device and the second terminal are spaced apart from each other by 2 meters and the second terminal is positioned in the first direction, and the graphs of FIG. 11D may indicate the case in which the control device and the second terminal are spaced apart from each other by 2 meters and the second terminal is positioned in the second direction.

In the graphs of FIGS. 11A, 11B, 11C, 11D, the X-axis indicates each quadrant. If the graphs of FIGS. 11A, 11B, 11C, 11D are referred to as the first, second, third graphs from the top graphs to the bottom graphs, the Y-axis of the first graphs of FIGS. 11A, 11B, 11C, 11D indicates a ratio of CIR data existing in each quadrant of the IQ plot, the Y-axis of the second graphs indicates a variance of angle values of CIR data in each quadrant, and the Y-axis of the third graphs indicates a standard deviation of angle values of CIR data in each quadrant.

In the graphs of FIGS. 11A, 11B, 11C, 11D, bars filled with dots indicate values related to the whole CIR data, and bars filled with diagonal lines indicate values related to CIR data selected based on a position of CIR data in the IQ plot. For example, the bars filled with diagonal lines indicate values related to CIR data whose distance to the origin in the IQ plot is 300 or more. Hereinafter, for the convenience of explanation, operations of the control device will be described based on the bars filled with diagonal lines, that is, values related to selected CIR data, but this should not be considered as limiting. The following descriptions may be applied to the bars filled with dots, that is, values related to the whole CIR data.

In an embodiment, the control device may select a predetermined number of quadrants from the four quadrants in the IQ plot. For example, in the case of the first graphs of FIG. 11A, the control device may select the first quadrant and the third quadrant in which the rate of CIR data is high. Likewise, the control device may select the second quadrant and the fourth quadrant in the case of FIG. 11B, may select the first quadrant and the fourth quadrant in the case of FIG. 11C, and may select the third quadrant and the fourth quadrant in the case of FIG. 11D.

In addition, the control device may calculate a mean on the distribution of angle values of CIR data in each quadrant, and may calculate a variance of angle values of CIR data in each quadrant, based on the mean. The variance of angle values of CIR data may be expressed by the second graphs of FIGS. 11A, 11B, 11C, 11D. In addition, the control device may calculate a standard deviation of angle values of CIR data in each quadrant, based on the variance of angle values of CIR data in each quadrant. The standard deviation of angle values of CIR data may be expressed by the third graphs of FIGS. 11A, 11B, 11C, 11D.

In addition, threshold values for the standard deviation of angle values of CIR data may be set in the control device. The control device may determine whether the second terminal is positioned in the first direction or the second direction by applying the threshold value to the standard deviation of angle values of CIR data. In the examples of FIGS. 11A, 11B, 11C, 11D, the threshold value may be set to 20. In the third graphs of FIGS. 11A and 11C, the standard deviation of angle values of CIR data in the two selected quadrants may be less than 20. Accordingly, in the case of FIGS. 11A and 11C, the control device may determine that the second terminal is positioned in the first direction.

On the other hand, in the third graphs of FIGS. 11B and 11D, the standard deviation of angle values of CIR data in the two selected quadrants may be 20 or more. Accordingly, the control device may determine that the second terminal is positioned in the second direction in the case of FIGS. 11B and 11D.

In addition, in another embodiment, at step S200, the control device may determine whether the terminal is positioned in the first direction or the second direction by using a parameter according to the UWB signal and the distribution of angle values of CIR data described above (for example, the variance and/or standard deviation on the angle values of the CIR data). For example, the parameter according to the UWB signal may refer to a parameter that is analyzed based on the UWB signal, such as a strength of the UWB signal, a received signal strength indication (RSSI), an angle value, an angle of arrival (AoA), a signal to noise ratio (SNR), etc.

The control device may perform correlation analysis on the parameter according to the UWB signal and the distribution of angle values of CIR data (for example, the variance and/or standard deviation on the angle values of the CIR data), and may determine whether the terminal is positioned in the first direction or the second direction, based on the result of the correlation analysis.

For example, the control device may acquire SNR values of CIR data acquired in the first direction and CIR data acquired in the second direction, and may identify a variance value of the SNR values, and then finally, may more accurately determine whether the user terminal is positioned in the first direction or the second direction, by analyzing a difference in the SNR values of the CIR data and the variance value, and CIR power.

More specifically, at step S200, the control device may acquire the SNR values of the CIR data, and may acquire a variance value of the acquired SNR values. In addition, the control device may acquire a power value of the CIR data.

In an embodiment, the control device may acquire SNR values of CIR data, a power value of the CIR data, and/or a variance value of the SNR values from a manufacturer of a communication module. The control device may perform correlation analysis on the acquired SNR values, the variance value of the SNR values, and the power value of the CIR data, and may determine whether the terminal is positioned in the first direction or the second direction, based on the result of the correlation analysis.

In an embodiment, the control device may acquire a ratio value to a value resulting from measurement of a distance with respect to at least one of the SNR value of the CIR data, the power value of the CIR data, the variance value of the SNR values, and the distribution of angle values of CIR data. For example, the ratio value to the value resulting from measurement of the distance may be experimentally determined. In addition, the control device may determine whether the terminal is positioned in the first direction or the second direction by using at least one of the SNR value of the CIR data, the power value of the CIR data, the variance value of the SNR values or the distribution of angle values of CIR data, and the ratio value to the value resulting from measurement of the distance. For example, when the distance to the terminal is positioned within a predetermined section, the control device may determine whether the terminal is positioned in the first direction or the second direction by using the ratio value to the value resulting from measurement of the distance.

In addition, in another embodiment, at step S200, the control device may determine whether the terminal is positioned in the first direction or the second direction, based on the number of packets received. Specifically, the control device may determine whether the terminal is positioned in the first direction or the second direction, based on a ranging frame of packets of the received UWB signal. As described above, when the terminal is positioned in the second direction, the strength of the UWB signal received at the control device may be weaker than when the terminal is positioned in the first direction, or the number of packets of the UWB signal may be smaller than when the terminal is positioned in the first direction, and accordingly, the number of ranging frames of packets of the UWB signal may be small. Accordingly, the control device may compare the number of ranging frames received and a pre-defined threshold number of ranging frames, and may determine whether the terminal is positioned in the first direction or the second direction. More specifically, the threshold number of ranging frames may be pre-set in the control device. Theoretically, the threshold number of ranging frames may be set based on the number of ranging frames that can be acquired by the control device for a predetermined time. The control device may receive ranging frames for a predetermined time, and may determine that the terminal is positioned in the first direction when the number of ranging frames received is greater than or equal to the threshold number of ranging frames. In addition, when the number of ranging frames received is less than the threshold number of ranging frames, it is determined that the terminal is positioned in the second direction.

Various embodiments of the disclosure may be implemented as software including instructions that are stored in a storage medium that is readable by a machine (e.g., a computer) (machine-readable storage media). The machine may be a device that invokes instructions stored in the storage medium, and operates according to the invoked instructions, and may include an electronic device according to the disclosed embodiments. When the instructions are executed by a processor, the processor may perform a function corresponding to the instructions directly by itself or by using other components under control of the processor. The instructions may include a code generated or executed by a complier or an interpreter. The machine-readable storage medium may be provided in the form of a non-transitory storage medium. The term "non-transitory" simply means that the storage medium does not include a signal and is a tangible device, but this term does not differentiate between where data is semi-permanently stored in the storage medium and where the data is temporarily stored in the storage medium. For example, the 'non-transitory storage medium' may include a buffer in which data is temporarily stored.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of a downloadable application, as an example of the computer program product, may be temporarily generated or at least temporarily stored in a storage medium, such as a memory of a manufacturer's server, a server of an application store, or a relay server.

Although the embodiments have been described with reference to specified embodiments and drawings as described above, various modifications and changes may be made from the above descriptions by a person skilled in the art. For example, even when the above-described technologies are performed in a different order from that described above, and/or components of the above-described system, structure, device, circuit, etc. are coupled or combined in different forms from that described above, or are replaced or substituted with other components or equivalents, appropriate results may be achieved.

Therefore, other implementations, other embodiments, and equivalents to the scope of the claims belong to the scope of the claims presented below.

What is claimed is:

1. An access control device comprising:
a communication module configured to perform communication by using a UWB communication protocol; and
one or more processors configured to control the access control device to perform communication with a user terminal positioned in the proximity of the access control device by using the communication module,
wherein the communication module comprises: a substrate; an antenna disposed on a first surface of the substrate; and a ground disposed on a second surface which is opposite to the first surface of the substrate,
wherein the one or more processors are configured to:
receive a signal from the user terminal through the communication module; and determine whether the user terminal is positioned in a first direction or second direction, based on a change in a phase angle of the signal received from the user terminal when a direction from the substrate to the antenna is the first direction and a direction from the substrate to the ground is the second direction,
wherein the signal received from the user terminal comprises a plurality of packets,
wherein each of the plurality of packets comprises an STS field,
wherein a plurality of CIR data of the signal received from the user terminal are acquired through correlation calculation on the STS field included in each of the plurality of packets,
wherein each of the plurality of CIR data comprises an in-phase component and a quadrature-phase component, and
wherein the one or more processors are configured to generate an IQ plot based on the in-phase component and the quadrature-phase component, each of the plurality of CIR data being expressed by dots on the IQ plot; and determine whether the user terminal is positioned in the first direction or the second direction, based on the IQ plot.

2. The access control device of claim 1, wherein the one or more processors are configured to: calculate angle values of the plurality of CIR data in four quadrants of the IQ plot; and determine whether the user terminal is positioned in the first direction or the second direction, based on a distribution of the angle values of the plurality of CIR data.

3. The access control device of claim 2, wherein the one or more processors are configured to calculate angle values of a plurality of CIR data corresponding to the plurality of packets, respectively, in pre-defined N number of quadrants among the four quadrants of the IQ plot, the N being a natural number less than or equal to 3.

4. The access control device of claim 2, wherein the one or more processors are configured to calculate a first standard deviation value indicating a standard deviation of the angle values of the plurality of CIR data, and to determine whether the user terminal is positioned in the first direction or the second direction, based on the first standard deviation value.

5. The access control device of claim 4, wherein the one or more processors are configured to compare the first standard deviation value and a pre-defined standard deviation value, and to determine whether the user terminal is positioned in the first direction or the second direction based on a result of the comparing.

6. The access control device of claim 5, wherein the one or more processors are configured to:
calculate distances of the plurality of CIR data from the origin in the IQ plot;
calculate angle values of a plurality of CIR data having a distance less than or equal to a pre-defined distance from the origin;
calculate a second standard deviation value indicating a standard deviation of the angle values of the plurality of CIR data the distance of which is less than or equal to the pre-defined distance;
compare the second standard deviation value and the pre-defined standard deviation value; and
determine whether the user terminal is positioned in the first direction or the second direction based on a result of the comparing.

7. The access control device of claim 5, wherein the one or more processors are configured to:
calculate a correlation analysis value by performing correlation analysis of a parameter according to the signal received from the user terminal and the distribution of the angle values of the plurality of CIR data; and
determine whether the user terminal is positioned in the first direction or the second direction based on the correlation analysis value.

8. The access control device of claim 1, wherein the one or more processors are configured to:
compare the number of the plurality of packets and a pre-defined number of packets; and
determine whether the user terminal is positioned in the first direction or the second direction based on a result of the comparing.

9. The access control device of claim 8, wherein each of the plurality of packets comprises a ranging frame (RFRAME), and
wherein the one or more processors are configured to compare the number of ranging frames included in each of the plurality of packets and a pre-defined threshold number of ranging frames, and to determine whether the user terminal is positioned in the first direction or the second direction based on a result of the comparing.

10. The access control device of claim 1, wherein the ground comprises a conductive material for electromagnetic shielding.

11. A control method of an access control device, the access control device comprising a communication module configured to perform communication by using a UWB communication protocol, the communication module comprising a substrate, an antenna disposed on a first surface of the substrate, and a ground disposed on a second surface which is opposite to the first surface of the substrate,
wherein the control method comprises:
receiving a signal from a user terminal through the communication module; and
determining whether the user terminal is positioned in a first direction or second direction, based on a change in a phase angle of the signal received from the user terminal when a direction from the substrate to the antenna is the first direction and a direction from the substrate to the ground is the second direction,
wherein the signal received from the user terminal comprises a plurality of packets,
wherein each of the plurality of packets comprises an STS field, wherein a plurality of CIR data of the signal received from the user terminal are acquired through correlation calculation on the STS field included in each of the plurality of packets, wherein each of the plurality of CIR data comprises an in-phase component and a quadrature-phase component, and wherein the determining whether the user terminal is positioned in a first direction or second direction comprises generating an IQ plot based on the in-phase component and the quadrature-phase component, each of the plurality of CIR data being expressed by dots on the IQ plot; and determining whether the user terminal is positioned in the first direction or the second direction, based on the IQ plot.

12. A non-transitory computer-readable recording medium having a program recorded thereon for executing the method according to claim 11.

* * * * *